US010814622B2

(12) United States Patent
Gohda et al.

(10) Patent No.: US 10,814,622 B2
(45) Date of Patent: *Oct. 27, 2020

(54) LIQUID EJECTION APPARATUS, LIQUID EJECTION SYSTEM, AND LIQUID EJECTION METHOD

(71) Applicant: Ricoh Company, Ltd., Tokyo (JP)

(72) Inventors: Mitsunobu Gohda, Kanagawa (JP); Tsuyoshi Nagasu, Kanagawa (JP); Koichi Kudo, Kanagawa (JP); Tomoaki Hayashi, Tokyo (JP); Masayuki Sunaoshi, Ibaraki (JP); Masahiro Mizuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,539

(22) Filed: Mar. 10, 2017

(65) Prior Publication Data

US 2017/0266965 A1 Sep. 21, 2017

(30) Foreign Application Priority Data

Mar. 17, 2016 (JP) ................................ 2016-054316
Feb. 27, 2017 (JP) ................................ 2017-034352

(51) Int. Cl.
*B41J 2/045* (2006.01)
*B41J 15/04* (2006.01)
(Continued)

(52) U.S. Cl.
CPC ....... *B41J 2/04573* (2013.01); *B41J 2/04586* (2013.01); *B41J 2/2135* (2013.01);
(Continued)

(58) Field of Classification Search
CPC ................................................. B41J 2/204573
See application file for complete search history.

(56) References Cited

U.S. PATENT DOCUMENTS 9,028,027 B2 5/2015 Bell et al.
9,227,439 B1 * 1/2016 Katerberg ............ B41J 11/0095
(Continued)

FOREIGN PATENT DOCUMENTS

EP 0926631 A2 * 6/1999 ............ B41J 11/008
EP 3216614 9/2017
(Continued)

OTHER PUBLICATIONS

U.S. Appl. No. 15/294,904, filed Oct. 17, 2016.
European Office Action for 17160786.4 dated Oct. 1, 2018.

*Primary Examiner* — Shelby L Fidler
(74) *Attorney, Agent, or Firm* — IPUSA, PLLC

(57) ABSTRACT

A liquid ejection apparatus is provided that includes a plurality of liquid ejection head units that are configured to eject liquid onto a conveyed object being conveyed; a detection unit that is provided with respect to each liquid ejection head unit of the plurality of liquid ejection head units and is configured to output a detection result indicating at least one of a position, a moving speed, and an amount of movement of the conveyed object with respect to a conveying direction of the conveyed object; and a control unit configured to control the each liquid ejection head unit of the plurality of liquid ejection head units to eject liquid at a timing based on a plurality of the detection results of a plurality of the detection units.

14 Claims, 21 Drawing Sheets

(51) Int. Cl.
*B41J 11/00* (2006.01)
*B41J 2/21* (2006.01)

(52) U.S. Cl.
CPC ........... *B41J 2/2146* (2013.01); *B41J 11/008* (2013.01); *B41J 11/0095* (2013.01); *B41J 15/046* (2013.01)

(56) References Cited

U.S. PATENT DOCUMENTS

| | | | | |
|---|---|---|---|---|
| 9,440,431 | B2 | 9/2016 | Hommi | |
| 2003/0133097 | A1* | 7/2003 | Yamaguchi | B65H 7/14 356/28 |
| 2005/0185009 | A1* | 8/2005 | Claramunt | B41J 2/435 347/16 |
| 2006/0132523 | A1* | 6/2006 | Xie | B41J 11/42 347/16 |
| 2007/0237558 | A1* | 10/2007 | Nakanishi | H04N 1/00002 399/394 |
| 2009/0002424 | A1* | 1/2009 | Kiyama | B41J 3/543 347/16 |
| 2014/0044460 | A1* | 2/2014 | Kudo | G03G 15/5054 399/301 |
| 2015/0014918 | A1* | 1/2015 | Piatt | B65H 9/20 271/227 |
| 2015/0035893 | A1* | 2/2015 | Piatt | B41J 11/46 347/16 |
| 2016/0121602 | A1 | 5/2016 | Nagasu et al. | |
| 2017/0057258 | A1* | 3/2017 | Otsuka | B41J 13/0009 |

FOREIGN PATENT DOCUMENTS

| | | |
|---|---|---|
| JP | 2015-013476 | 1/2015 |
| JP | 2015-064324 | 4/2015 |

* cited by examiner

LIQUID EJECTION APPARATUS, LIQUID EJECTION SYSTEM, AND LIQUID EJECTION METHOD

CROSS-REFERENCE TO RELATED APPLICATIONS

The present application claims priority under 35 U.S.C. § 119 to Japanese Patent Application No. 2016-054316 filed on Mar. 17, 2016 and Japanese Patent Application No. 2017-034352 filed on Feb. 27, 2017, the entire contents of which are incorporated herein by reference.

BACKGROUND OF THE INVENTION

1. Field of the Invention

The present disclosure relates to a liquid ejection apparatus, a liquid ejection system, and a liquid ejection method.

2. Description of the Related Art

Techniques for performing various processes using a head unit are known. For example, techniques for forming an image using the so-called inkjet method that involves ejecting ink from a print head are known. Also, techniques are known for improving the print quality of an image printed on a print medium using such image forming techniques.

For example, a method for improving print quality by adjusting the position of a print head is known. Specifically, such method involves using a sensor to detect positional variations in a transverse direction of a web corresponding to a print medium that passes through a continuous paper printing system. The method further involves adjusting the position of the print head in the transverse direction in order to compensate for the positional variations detected by the sensor (e.g., see Japanese Unexamined Patent Publication No. 2015-13476).

SUMMARY OF THE INVENTION

According to one embodiment of the present invention, a liquid ejection apparatus is provided that includes a plurality of liquid ejection head units that are configured to eject liquid onto a conveyed object being conveyed; a detection unit that is provided with respect to each liquid ejection head unit of the plurality of liquid ejection head units and is configured to output a detection result indicating at least one of a position, a moving speed, and an amount of movement of the conveyed object with respect to a conveying direction of the conveyed object; and a control unit configured to control the each liquid ejection head unit of the plurality of liquid ejection head units to eject liquid at a timing based on a plurality of the detection results of a plurality of the detection units.

DESCRIPTION OF THE EMBODIMENTS

For example, in order to further improve the image quality of an image formed by a liquid ejection apparatus, measures for accurately controlling the landing position of ejected liquid may be desired. For example, when a shift occurs in the landing position of ejected liquid, image quality may be degraded.

An aspect of the present invention is directed to providing a liquid ejection apparatus that is capable of improving accuracy of a processing position, such as a landing position of ejected liquid, in the conveying direction of a conveyed object.

In the following, embodiments of the present invention are described with reference to the accompanying drawings.

<Overall Configuration>

In the following, an example case is described where a head unit included in a conveying apparatus corresponds to a liquid ejection head unit that ejects liquid.

Figure 1:
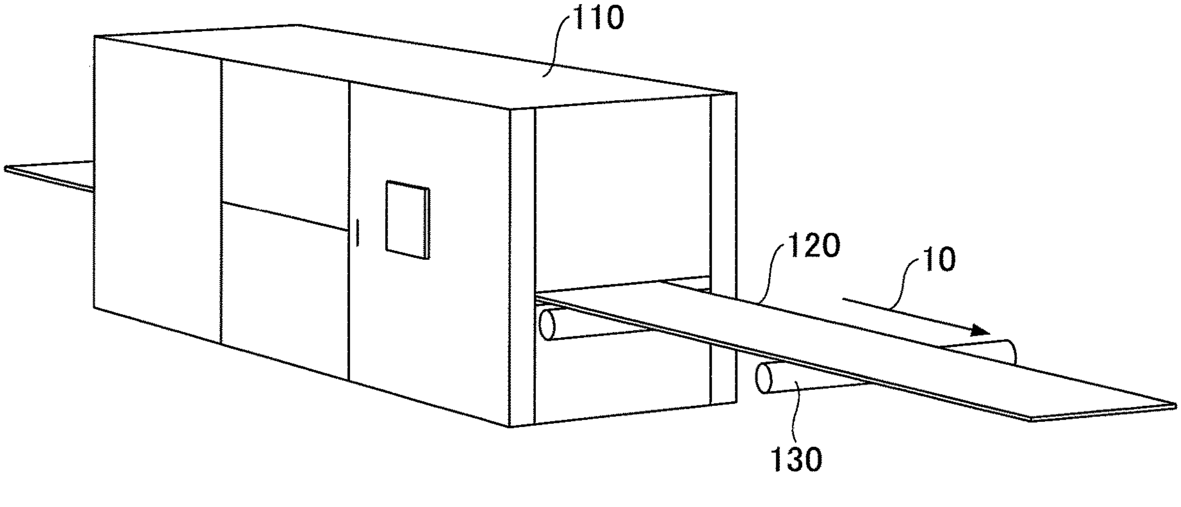
FIG. 1 is a schematic perspective view of a liquid ejection apparatus according to an embodiment of the present invention.

FIG. 1 is a schematic diagram illustrating an example liquid ejection apparatus according to an embodiment of the present invention. For example, a liquid ejection apparatus according to an embodiment of the present invention may be an image forming apparatus 110 as illustrated in FIG. 1. Liquid ejected by such an image forming apparatus 110 may be recording liquid, such as aqueous ink or oil-based ink, for example. Hereinafter, the image forming apparatus 110 is described as an example liquid ejection apparatus according to an embodiment of the present invention.

A conveyed object conveyed by the image forming apparatus 110 may be a recording medium, for example. In the illustrated example, the image forming apparatus 110 ejects liquid on a web 120 corresponding to an example of a recording medium that is conveyed by a roller 130 to form an image thereon. Also, note that the web 120 may be a so-called continuous paper print medium, for example. That is, the web 120 may be a rolled sheet that is capable of being wound up, for example. Thus, the image forming apparatus 110 may be a so-called production printer. In the following, an example is described where the roller 130 adjusts the tension of the web 120 and conveys the web 120 in a direction indicated by arrow 10 (hereinafter referred to as "conveying direction 10"). In the present example, it is assumed that the image forming apparatus 110 corresponds to an inkjet printer that forms an image on the web 120 by ejecting inks in four different colors, including black (K), cyan (C), magenta (M), and yellow (Y), at predetermined portions of the web 120.

Figure 2:
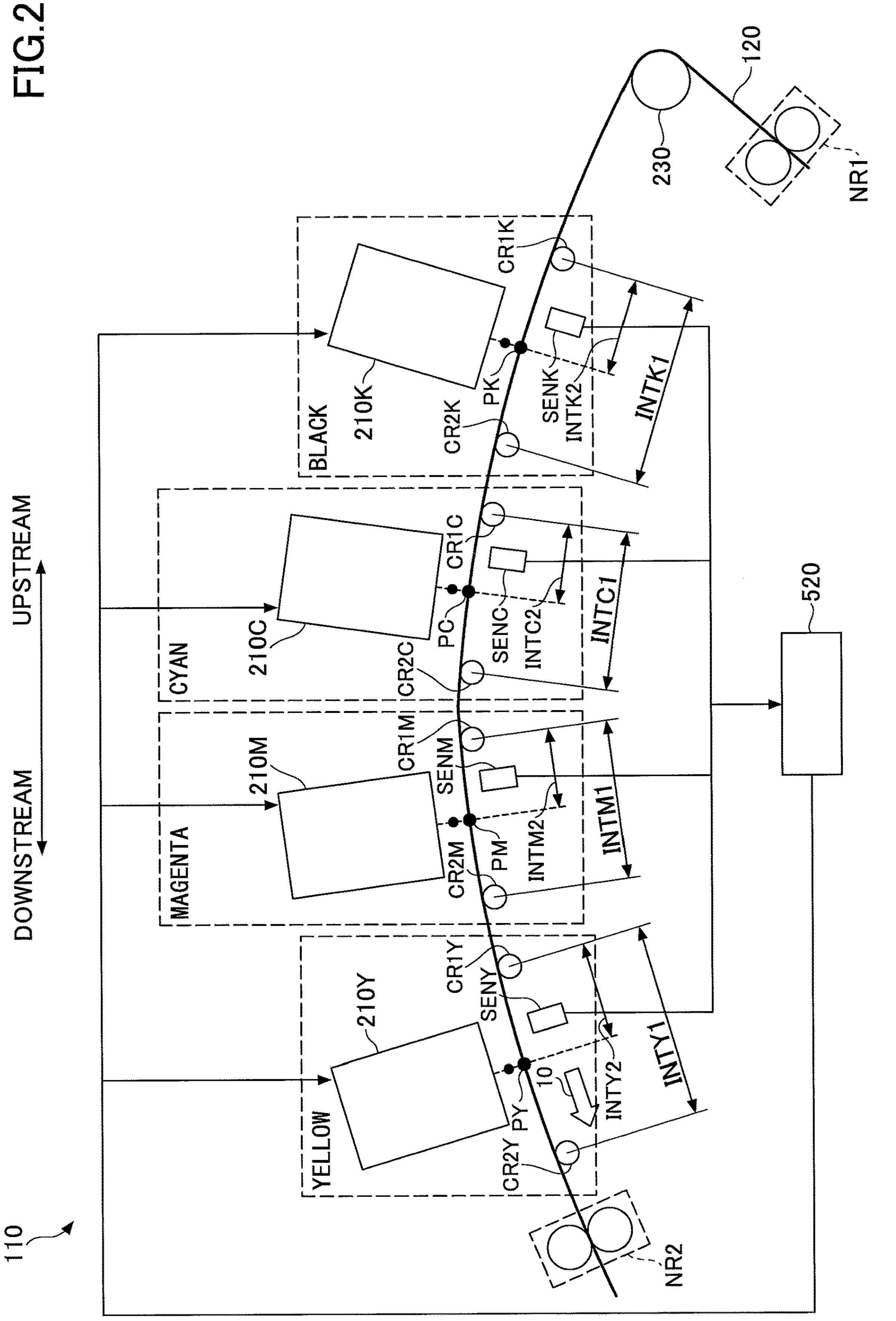
FIG. 2 is a schematic diagram illustrating an example overall configuration of the liquid ejection apparatus according to an embodiment of the present invention.

FIG. 2 is a schematic diagram illustrating an example overall configuration of the liquid ejection apparatus according to an embodiment of the present invention. In FIG. 2, the image forming apparatus 110 includes four liquid ejection head units for ejecting inks in the above four different colors.

Each liquid ejection head unit ejects ink in a corresponding color on the web 120 that is being conveyed in the conveying direction 10. Also, the web 120 is conveyed by two pairs of nip rollers NR1 and NR2, a roller 230, and the like. Hereinafter, the pair of nip rollers NR1 that is arranged upstream of the liquid ejection head units is referred to as "first nip rollers NR1". On the other hand, the pair of nip rollers NR2 that is arranged downstream of the first nip rollers NR1 and the liquid ejection head units is referred to as "second nip rollers NR2". Each pair of the nip rollers NR1 and NR2 is configured to rotate while holding a conveyed object, such as the web 120, therebetween. As described above, the first and second nip rollers NR1 and NR2 and the roller 230 may constitute a mechanism for conveying the web 120 in a predetermined direction.

Note that a recording medium to be conveyed, such as the web 120, is preferably relatively long. Specifically, the length of the recording medium is preferably longer than the distance between the first nip rollers NR1 and the second nip rollers NR2. Further, note that the recording medium is not limited to the web 120. For example, the recording medium may also be folded paper, such as the so-called "Z paper" that is stored in a folded state.

In the present example, it is assumed that the liquid ejection head units for the four different colors are arranged in the following order from the upstream side to the downstream side: black (K), cyan (C), magenta (M), and yellow (Y). That is, the liquid ejection head unit for black (K) (hereinafter referred to as "black liquid ejection head unit 210K") is installed at the most upstream side. The liquid ejection head unit for cyan (C) (hereinafter referred to as "cyan liquid ejection head unit 210C") is installed next to the black liquid ejection head unit 210K. The liquid ejection head unit for magenta (M) (hereinafter referred to as "magenta liquid ejection head 210M") is installed next to the cyan liquid ejection head unit 210C. The liquid ejection head unit for yellow (Y) (hereinafter referred to as "yellow liquid ejection head unit 210Y") is installed at the most downstream side.

The liquid ejection head units 210K, 210C, 210M, and 210Y are configured to eject ink in their respective colors on predetermined portions of the web 120 based on image data, for example. A position to which ink is ejected (hereinafter referred to as "landing position") may be substantially the same as a landing position of ink ejected from the liquid ejection head unit onto the recording medium. That is, the landing position may be directly below the liquid ejection head unit, for example. In the following, an example case is described where a landing position corresponds to a processing position at which a process is performed by a liquid ejection head unit.

In the present example, black ink is ejected onto the landing position of the black liquid ejection head unit 210K (hereinafter referred to as "black landing position PK"). Similarly, cyan ink is ejected onto the landing position of the cyan liquid ejection head unit 210C (hereinafter referred to as "cyan landing position PC"). Further, magenta ink is ejected onto the landing position of the magenta liquid ejection head unit 210M (hereinafter referred to as "magenta landing position PM"). Also, yellow ink is ejected onto the landing position of the yellow liquid ejection head unit 210Y (hereinafter referred to as "yellow landing position PY").

Note that the timing at which each of the liquid ejection head units ejects ink may be controlled by a controller 520 that is connected to each of the liquid ejection head units. The controller 520 may control the ejection timing based on detection results, for example.

Also, multiple rollers are installed with respect to each of the liquid ejection head units. For example, rollers may be installed at the upstream side and the downstream side of each of the liquid ejection head units. In the example illustrated in FIG. 2, a roller is installed at the upstream side of each liquid ejection head unit (hereinafter referred to as "first roller"). Also, a roller is installed at the downstream side of each liquid ejection head unit (hereinafter referred to as "second roller"). By installing the first roller and the second roller respectively at the upstream side and downstream side of each liquid ejection head unit, the so-called "fluttering" effect may be reduced, for example. In the present example, the first roller and the second roller are driven rollers. The first roller and the second roller may be rollers that are driven and rotated by a motor, for example.

Note that the first roller is an example of a first support member, and the second roller is an example of a second support member. The first roller and the second roller do not have to be driven rollers that are rotated. That is, the first roller and the second roller may be implemented by any suitable support member for supporting a conveyed object. For example, the first support member and the second support member may be implemented by a pipe or a shaft having a circular cross-sectional shape. Also, the first support member and the second support member may be implemented by a curved plate having an arc-shaped portion as a portion that comes into contact with a conveyed object, for example. In the following, the first roller is described as an example of a first support member and the second roller is described as an example of a second support member.

Specifically, with respect to the black liquid ejection head unit 210K, a first roller CR1K used for conveying the web 120 to the black landing position PK to eject black ink onto a predetermined portion of the web 120 is arranged at the upstream side of the black liquid ejection head unit 210K. Also, a second roller CR2K used for conveying the web 120 further downstream of the black landing position PK is arranged at the downstream side of the black liquid ejection head unit 210K. Similarly, a first roller CR1C and a second roller CR2C are respectively arranged at the upstream side and downstream side of the cyan liquid ejection head unit 210C. Further, a first roller CR1M and a second roller CR2M are respectively arranged at the upstream side and downstream side of the magenta liquid ejection head unit 210M. Further, a first roller CR1Y and a second roller CR2Y are respectively arranged at the upstream side and downstream side of the yellow liquid ejection head unit 210Y.

In the following, an example external configuration of the liquid ejection head units is described with reference to FIGS. 3A and 3B.

Figure 3A:
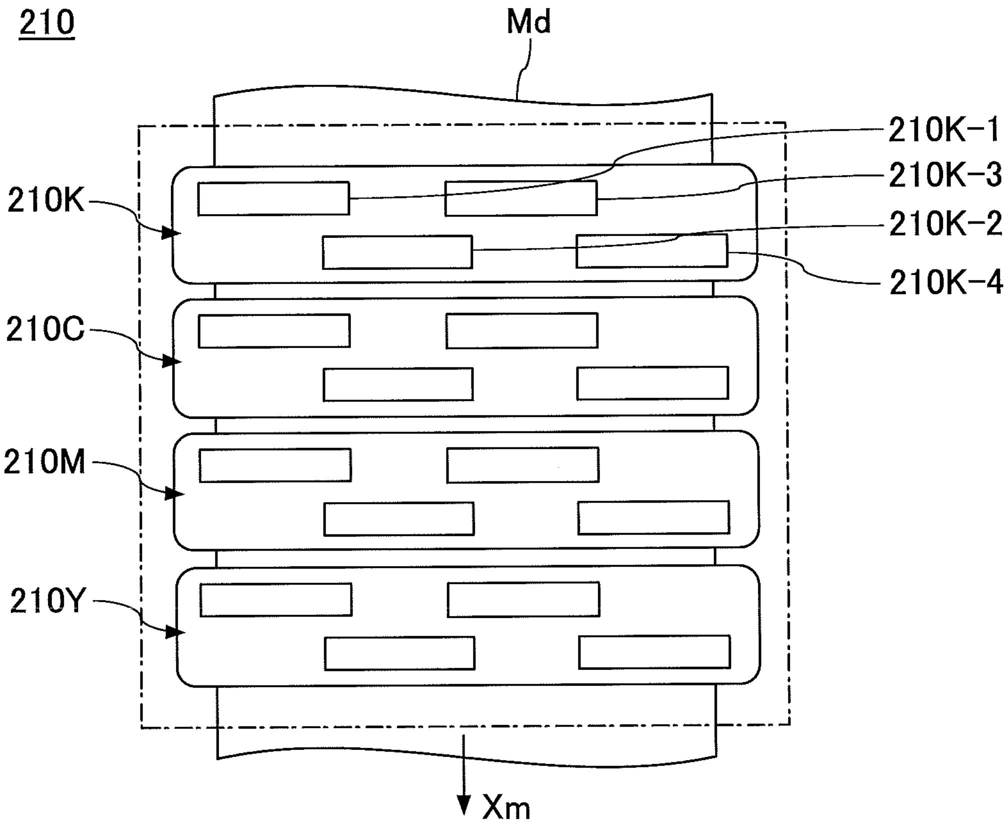
FIGS. 3A and 3B are diagrams illustrating an example external configuration of a liquid ejection head according to an embodiment of the present invention.
Figure 3B:
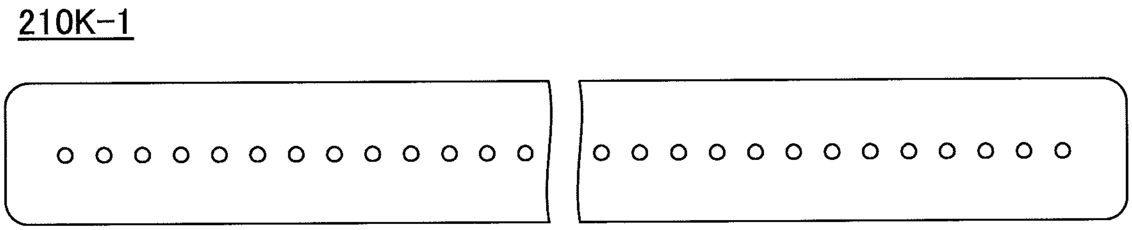

FIG. 3A is a schematic plan view of the four liquid ejection head units 210K, 210C, 210M, and 210Y included in the image forming apparatus 110 according to the present embodiment. FIG. 3B is an enlarged plan view of a head 210K-1 of the liquid ejection head unit 210K for ejecting black (K) ink.

In FIG. 3A, the liquid ejection head units are full-line type head units. That is, the image forming apparatus 110 has the four liquid ejection head units 210K, 210C, 210M, and 210Y for the four different colors, black (K), cyan (C), magenta (M), and yellow (Y), arranged in the above recited order from the upstream side to the downstream side in the conveying direction 10.

Note that the liquid ejection head unit 210K for ejecting black (K) ink includes four heads 210K-1, 210K-2, 210K-3, and 210K-4, arranged in a staggered manner in a direction orthogonal to the conveying direction 10. This enables the image forming apparatus 110 to form an image across the entire width of an image forming region (print region) of the web 120. Note that the configurations of the other liquid ejection head units 210C, 210M, and 210Y may be similar to that of the liquid ejection head unit 210K, and as such, descriptions thereof will be omitted.

Note that although an example where the liquid ejection head unit is made up of four heads is described above, the liquid ejection head unit may also be made up of a single head, for example.

<Detection Unit>

In the present embodiment, a sensor as an example of a detection unit for detecting a position, a moving speed, and/or an amount of movement of a recording medium is installed in each liquid ejection head unit. The sensor is preferably an optical sensor that uses light, such as laser light or infrared light, for example. The optical sensor may be a CCD (Charge Coupled Device) camera or a CMOS (Complementary Metal Oxide Semiconductor) camera, for example. Further, the optical sensor is preferably a global shutter optical sensor. By using a global shutter optical sensor as opposed to a rolling shutter optical sensor, for example, a so-called image shift caused by a deviation of the shutter timing may be reduced even when the recording medium is moving at a high moving speed. The sensor may have a configuration as described below, for example.

Figure 4:
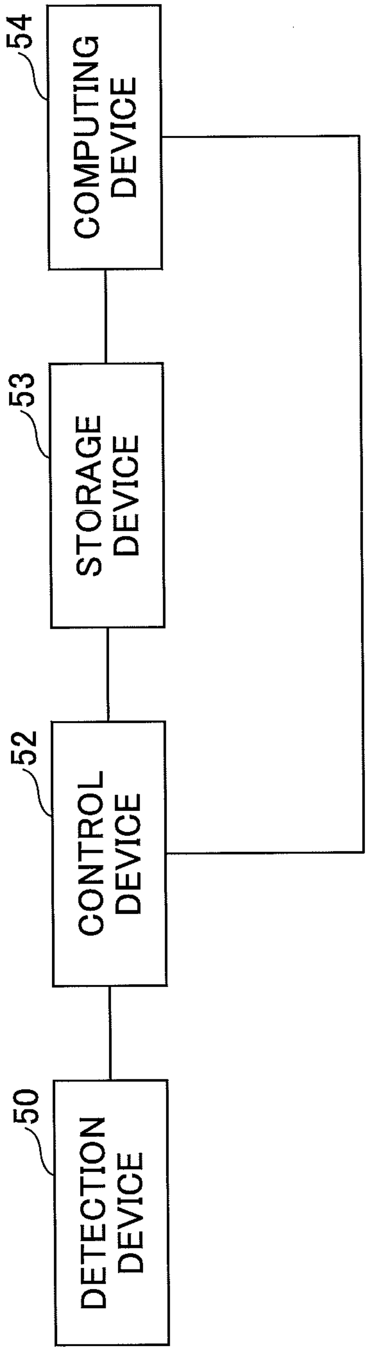
FIG. 4 is a schematic diagram illustrating an example hardware configuration of a detection unit according to an embodiment of the present invention.

FIG. 4 is a block diagram illustrating an example hardware configuration for implementing the detection unit according to an embodiment of the present invention. For example, the detection unit may include hardware components, such as a detection device 50, a control device 52, a storage device 53, and a computing device 54.

In the following, an example configuration of the detection device 50 is described.

Figure 5:
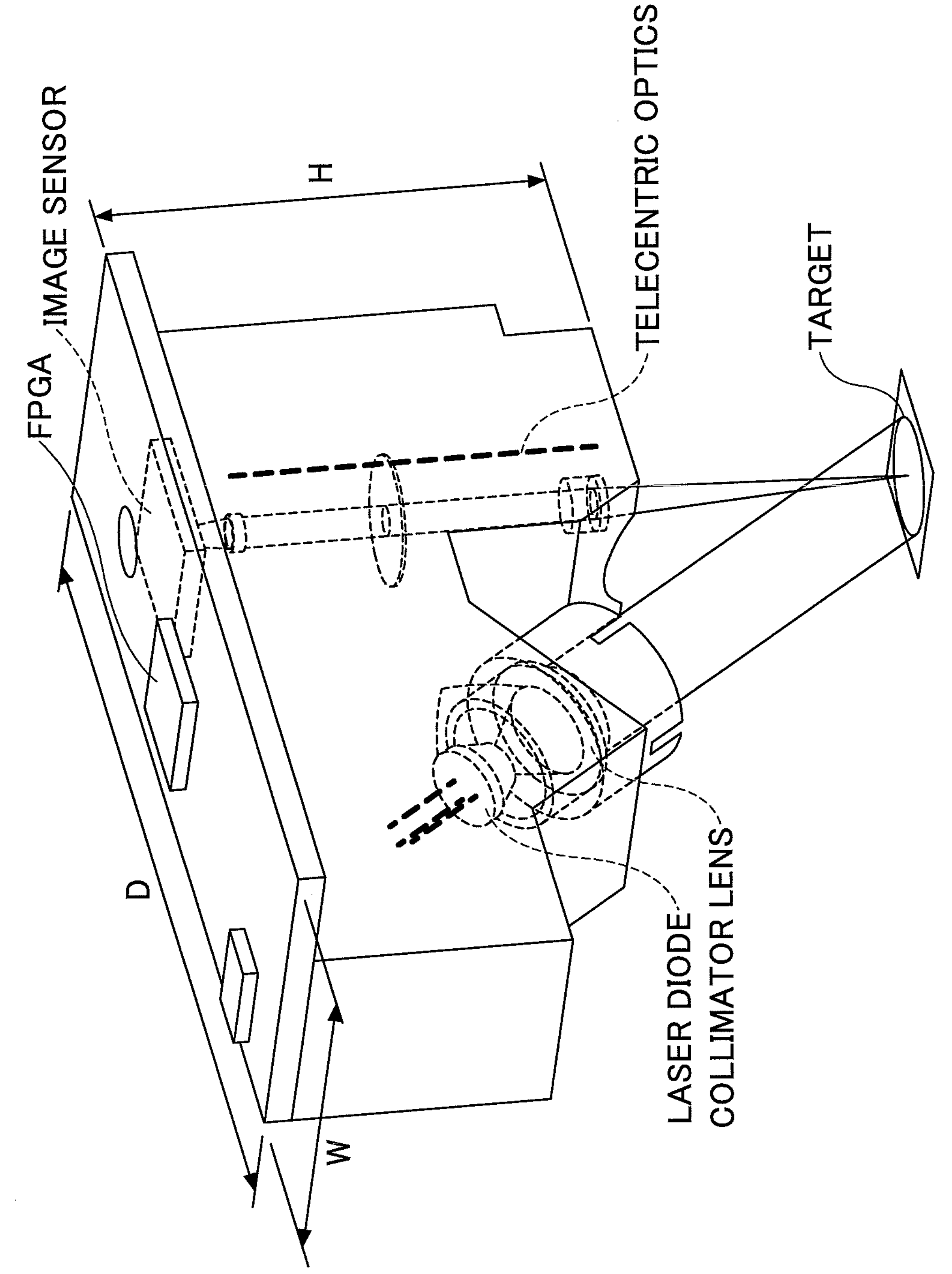
FIG. 5 is an external view of a detection device according to an embodiment of the present invention.

FIG. 5 is an external view of an example detection device according to an embodiment of the present invention.

The detection device illustrated in FIG. 5 performs detection by capturing an image of a speckle pattern that is formed when light from a light source is incident on a conveyed object, such as the web 120, for example. Specifically, the detection device includes a semiconductor laser diode (LD) and an optical system such as a collimator lens (CL). Further, the detection device includes a CMOS (Complementary Metal Oxide Semiconductor) image sensor for capturing an image of a speckle pattern and a telecentric optical imaging system (telecentric optics) for imaging the speckle pattern on the CMOS image sensor.

In the example illustrated in FIG. 5, for example, the CMOS image sensor may capture an image of the speckle pattern multiple times, such as at time T1 and at time T2. Then, based on the image captured at time T1 and the image captured at time T2, a calculating device, such as a FPGA (Field-Programmable Gate Array) circuit, may perform a process such as cross-correlation calculation. Then, based on the movement of the correlation peak position calculated by the cross-correlation calculation, the detection device may output the amount of movement of the conveyed object from time T1 to time T2, for example. Note that in the illustrated example, it is assumed that the width (W)×depth (D)×height (H) dimensions of the detection device is 15 mm×60 mm×32 mm. The cross-correlation calculation is described in detail below.

Note that the CMOS image sensor is an example of hardware for implementing an imaging unit, and the FPGA circuit is an example of a calculating device.

Referring back to FIG. 4, the control device 52 controls other devices such as the detection device 50. Specifically, for example, the control device 52 outputs a trigger signal to the detection device 50 to control the timing at which the CMOS image sensor releases a shutter. Also, the control device 52 controls the detection device 50 so that it can acquire a two-dimensional image from the detection device 50. Then, the control device 52 sends the acquired two-dimensional image captured and generated by the detection device 50 to the storage device 53, for example.

The storage device 53 may be a so-called memory, for example. The storage device 53 is preferably configured to be capable of dividing the two-dimensional image received from the control device 52 and storing the divided image data in different storage areas.

The computing device 54 may be a microcomputer or the like. That is, the computing device 54 performs arithmetic operations for implementing various processes using image data stored in the storage device 53, for example.

The control device 52 and the computing device 54 may be implemented by a CPU (Central Processing Unit) or an electronic circuit, for example. Note that the control device 52, the storage device 53, and the computing device 54 do not necessarily have to be different devices. For example, the control device 52 and the computing device 54 may be implemented by one CPU, for example.

<Functional Configuration of Detection Unit>

Figure 6:
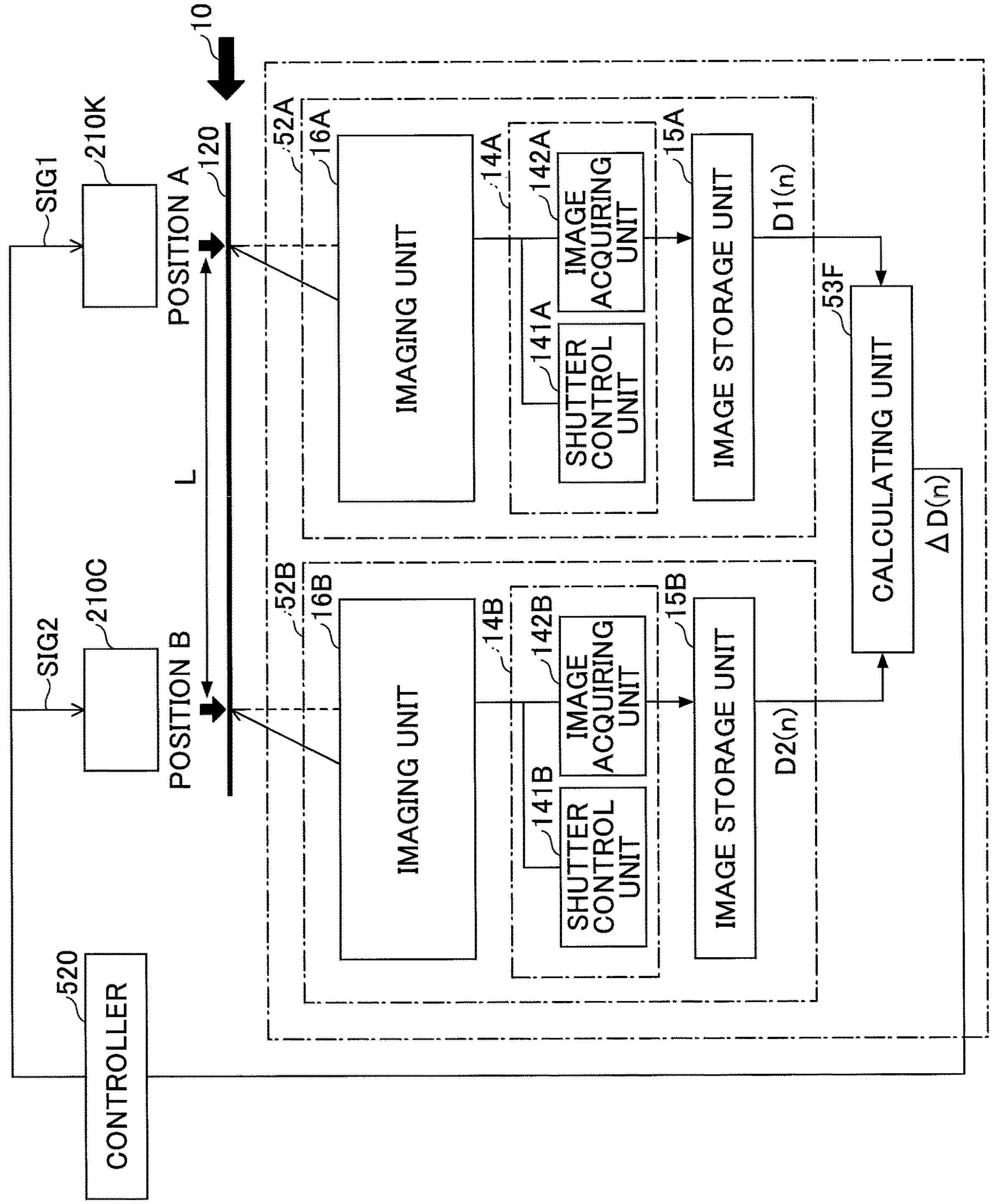
FIG. 6 is a block diagram illustrating an example functional configuration of the detection unit according to an embodiment of the present invention.

FIG. 6 is a block diagram illustrating an example functional configuration of the detection unit according to an embodiment of the present invention. Note that in FIG. 6, example configurations of detection units provided for the black liquid ejection head unit 210K and the cyan liquid ejection head unit 210C among the detection units provided for the liquid ejection head units 210K, 210C, 210M, and 210Y are illustrated. Also, in FIG. 6, an example case is described where a detection unit 52A for the black liquid ejection head unit 210K outputs detection results relating to a "position A", and a detection unit 52B for the cyan liquid ejection head unit 210C outputs detection results relating to a "position B". The detection unit 52A for the black liquid ejection head unit 210K includes an imaging unit 16A, an imaging control unit 14A, and an image storage unit 15A. Similarly, the detection unit 52B for the cyan liquid ejection head unit 210C includes an imaging unit 16B, an imaging control unit 14B, and an image storage unit 15B. In the following, the detection unit 52A is described as a representative example.

The imaging unit 16A captures an image of a conveyed object such as the web 120 that is conveyed in the conveying direction 10. The imaging unit 16A may be implemented by the detection device 50 of FIG. 4, for example.

The imaging control unit 14A includes a shutter control unit 141A and an image acquiring unit 142A. The imaging control unit 14A may be implemented by the control device 52 of FIG. 4, for example.

The image acquiring unit 142A acquires an image captured by the imaging unit 16A.

The shutter control unit 141A controls the timing at which the imaging unit 16A captures an image.

The image storage unit 15A stores an image acquired by the imaging control unit 14A. The image storage unit 15A may be implemented by the storage device 53 of FIG. 4, for example.

A calculating unit 53F is capable of calculating the position of a pattern on the web 120, the moving speed of the web 120 being conveyed, and the amount of movement of the web 120 being conveyed, based on images stored in the image storage unit 15A and the image storage unit 15B. Also, the calculating unit 53F outputs to the shutter control unit 141A, data such as a time difference Δt indicating the timing for releasing a shutter. That is, the calculating unit 53F outputs a trigger signal to the shutter control unit 141A so that an image representing "position A" and an image representing "position B" may be captured at different timings having the time difference Δt, for example. Also, the calculating unit 53F may control a motor or the like that is used to convey the web 120 so as to achieve a calculated moving speed, for example. The calculating unit 53F may be implemented by the controller 520 of FIG. 2, for example.

The web 120 is a member having scattering properties on its surface or in its interior, for example. Thus, when laser light from a light source is irradiated on the web 120, the laser light is diffusely reflected by the web 120. By this diffuse reflection, a pattern may be formed on the web 120. The pattern may be a so-called speckle pattern including speckles (spots), for example. Thus, when the web 120 is imaged, an image representing the speckle pattern may be obtained. Because the position of the speckle pattern can be determined based on the obtained image, the detection unit may be able to detect where a predetermined position of the web 120 is located. Note that the speckle pattern may be generated by the interference of irradiated laser beams caused by a roughness of the surface or the interior of the web 120, for example.

Also, the light source is not limited to an apparatus using laser light. For example, the light source may be an LED (Light Emitting Diode) or an organic EL (Electro-Luminescence) element. Also, depending on the type of light source used, the pattern formed on the web 120 may not be a speckle pattern. In the example described below, it is assumed that the pattern is a speckle pattern.

When the web 120 is conveyed, the speckle pattern of the web 120 is also conveyed. Therefore, the amount of movement of the web 120 may be obtained by detecting the same speckle pattern at different times. That is, by detecting the same speckle pattern multiple times to obtain the amount of movement of the speckle pattern, the calculating unit 53F may be able to obtain the amount of movement of the web 120. Further, the calculating unit 53F may be able to obtain the moving speed of the web 120 by converting the above obtained amount of movement into a distance per unit time, for example.

As illustrated in FIG. 6, the imaging units are arranged at fixed intervals along the conveying direction 10, and the web 120 is imaged by each of these imaging units at their respective positions.

Given the time difference Δt, the shutter control unit 141A controls the imaging unit 16A to image the web 120 and the shutter control unit 141B controls the imaging unit 16B to image the web 120 at different times with the time difference Δt. The calculating unit 53F obtains the amount of movement of the web 120 based on speckle patterns represented by the images generated by the above imaging operation. Specifically, assuming V [mm/s] denotes the moving speed of the web 120 and L [mm] denotes a relative distance between imaging positions in the conveying direction 10, the time difference Δt can be expressed by the following equation (1).

$$\Delta t = L/V \tag{1}$$

Note that the relative distance L [mm] in the above equation (1) corresponds to the distance between the "position A" and the "position B" which can be determined in advance. Thus, when the time difference Δt is determined, the calculating unit 53F can calculate the moving speed V [mm/s] based on the above equation (1). In this way, the image forming apparatus 110 can obtain the position, the amount of movement, and/or the moving speed of the web 120 in the conveying direction 10 with high accuracy. Note that the image forming apparatus 110 may output a combination of the position, the amount of movement, and/or moving speed of the web 120 in the conveying direction.

Note that the detection unit may also be configured to detect the position of the web 120 in a direction orthogonal to the conveying direction, for example. That is, the detection unit may be used to detect a position in the conveying direction as well as a position in the direction orthogonal to the conveying direction. By configuring the detection unit to detect positions in both the conveying direction and the orthogonal direction as described above, the cost of installing a device for performing position detection may be reduced. In addition, because the number of sensors can be reduced, space conservation may be achieved, for example.

Further, the calculating unit 53F performs cross-correlation calculation with respect to image data D1(*n*) and image data D2(*n*) respectively representing the images captured by the detection unit 52A and the detection unit 52B. Note that in the following descriptions, an image generated by cross-correlation calculation is referred to as "correlation image". For example, the calculating unit 53F calculates a shift ΔD(n) based on the correlation image.

For example, the correlation calculation may be implemented using the following equation (2).

$$D1\bigstar D2^{*}=F{-}1[F[D1]\cdot F[D2]^{*}] \tag{2}$$

Note that in the above equation (2), "D1" denotes the image data D1(*n*), i.e., image data of the image captured at the "position A". Similarly, "D2" denotes the image data D2(*n*), i.e., the image data of the image captured at the "position B". Also, in the above equation (2), "F[ ]" denotes the Fourier transform and "F−1[ ]" denotes the inverse Fourier transform. Further, in the above equation (2), "*" denotes the complex conjugate, and "★" denotes the cross-correlation calculation.

As can be appreciated from the above equation (2), when the cross-correlation calculation "D1★D2" is performed with respect to the image data D1 and D2, image data representing the correlation image can be obtained. When the image data D1 and D2 are two-dimensional image data, the image data representing the correlation image is also two-dimensional image data. When the image data D1 and D2 are one-dimensional image data, the image data representing the correlation image is also one-dimensional image data.

Note that when a broad luminance distribution in the correlation image becomes an issue, for example, a phase-only correlation method may be used. The phase-only correlation method may be implemented by performing a calculation represented by the following equation (3), for example.

$$D1\bigstar D2^{*}=F{-}1[P[F[D1]]\cdot P[F[D2]^{*}]] \tag{3}$$

Note that in the above equation (3), "P[ ]" denotes extraction of only the phase from a complex amplitude. Also, all amplitudes are assumed to be "1".

In this way, even when a correlation image obtained using the Fourier transform has a broad luminance distribution, the calculating unit 53F can calculate the shift ΔD(n) based on a correlation image obtained using the phase-only correlation method, for example.

The correlation image represents a correlation between the image data D1 and D2. More specifically, as the degree of correlation between the image data D1 and D2 becomes higher, a sharper peak (so-called correlation peak) is output at a position close to the center of the correlation image. When the image data D1 and the image data D2 match, the position of the peak overlaps with the center of the correlation image.

Based on the above calculation, the black liquid ejection head unit 210K and the cyan liquid ejection head unit 210C respectively eject liquid at appropriate timings. Note that the liquid ejection timings of the black liquid ejection head unit 210K and the cyan liquid ejection head unit 210C may be controlled by a first signal SIG1 for the black liquid ejection head unit 210K and a second signal SIG2 for the cyan liquid ejection head unit 210C that are output by the controller 520, for example.

Referring back to FIG. 2, in the following descriptions, a device such as a detection device installed for the black liquid ejection head unit 210K is referred to as "black sensor SENK". Similarly, a device such as a detection device installed for the cyan liquid ejection head unit 210C is referred to as a "cyan sensor SENC". Also, a device such as a detection device installed for the magenta liquid ejection head unit 210M is referred to as "magenta sensor SENM". Further, a device such as a detection device installed for the yellow liquid ejection head unit 210Y is referred to as "yellow sensor SENY". In addition, in the following descriptions, the black sensor SENK, the cyan sensor SENC, the magenta sensor SENM, and the yellow sensor SENY may be simply referred to as "sensor" as a whole.

In the following descriptions, "sensor installation position" refers to a position where detection is performed. In other words, not all the elements of a detection device have to be installed at each "sensor installation position". For example, elements other than a sensor may be connected by a cable and installed at some other position. Note that in the example of FIG. 2, the black sensor SENK, the cyan sensor SENC, the magenta sensor SENM, and the yellow sensor SENY are installed at their corresponding sensor installation positions.

Note that the sensor installation positions for the liquid ejection head units are preferably located relatively close to the corresponding landing positions of the liquid ejection head units. By arranging a sensor close to each landing position, the distance between each landing position and the sensor may be reduced. By reducing the distance between each landing position and the sensor, detection errors may be reduced. In this way, the image forming apparatus 110 may be able to accurately detect the position of a recording medium such as the web 120 using the sensor.

Specifically, the sensor installation position close to the landing position may be located between the first roller and the second roller of each liquid ejection heat unit. That is, in the example of FIG. 2, the installation position of the black sensor SENK is preferably somewhere within range INTK1 between the first roller CR1K and the second roller CRK2. Similarly, the installation position of the cyan sensor SENC is preferably somewhere within range INTC1 between the first roller CR1C and the second roller CR2C. Also, the installation position of the magenta sensor SENM is preferably somewhere within range INTM1 between the first roller CR1M and the second roller CR2M. Further, the installation position of the yellow sensor SENY is preferably somewhere within range INTY1 between the first roller CR1Y and the second roller CY2Y.

By installing a sensor between each pair of rollers as described above, the sensor may be able to detect the position of a recording medium at a position close to the landing position of each liquid ejection head unit, for example. Note that the moving speed of a recording medium being conveyed tends to be relatively stable between the pair of rollers. Thus, the image forming apparatus 110 may be able to accurately detect the position of the recording medium using the sensors, for example.

More preferably, the sensor installation position is located toward the first roller with respect to the landing position of each liquid ejection head unit. In other words, the sensor installation position is preferably located upstream of the landing position.

Specifically, the installation position of the black sensor SENK is preferably located upstream of the black landing position PK, between the black landing position PK and the installation position of the first roller CR1K (hereinafter referred to as "black upstream section INTK2"). Similarly, the installation position of the cyan sensor SENC is preferably located upstream of the cyan landing position PC, between the cyan landing position PC and the installation position of the first roller CR1C (hereinafter referred to as "cyan upstream section INTC2"). Also, the installation position of the magenta sensor SENM is preferably located upstream of the magenta landing position PM, between the magenta landing position PM and the installation position of the first roller CR1M (hereinafter referred to as "magenta upstream section INTM2"). Further, the installation position of the yellow sensor SENY is preferably located upstream of the yellow landing position PY, between the yellow landing position PY and the installation position of the first roller CR1Y (hereinafter referred to as "yellow upstream section INTY2").

By installing the sensors within the black upstream section INTK2, the cyan upstream section INTC2, the magenta upstream section INTM2, and the yellow upstream section INTY2, the image forming apparatus 110 may be able to accurately detect the position of a recording medium using the sensors.

Further, by installing the sensors within the above sections, the sensors may be positioned upstream of the landing positions. In this way, the image forming apparatus 110 may be able to first accurately detect the position of a recording medium in the orthogonal direction and/or the conveying direction using the sensor installed at the upstream side. Thus, the image forming apparatus 110 can calculate the liquid ejection timing of each liquid ejection head unit and/or the amount of movement of the liquid ejection head unit. That is, for example, after the position of the web 120 is detected at an upstream side position, the web 120 may be conveyed toward the downstream side, and while the web 120 is being conveyed, the liquid ejection timing and the amount of movement of the liquid ejection head unit may be calculated so that the image forming apparatus 110 may be able to accurately adjust the landing position.

Note that in some embodiments, when the sensor installation position is located directly below each liquid ejection head unit, a color shift may occur due to a delay in control operations, for example. Thus, by arranging the sensor installation position to be at the upstream side of each landing position, the image forming apparatus 110 may be able to reduce color shifts and improve image quality, for example. Also, note that in some cases, the sensor installation position may be restricted from being too close to the landing position, for example. Thus, in some embodiments the sensor installation position may be located toward the first roller with respect to the landing position of each liquid ejection head unit, for example.

On the other hand, in some embodiments, the sensor installation position may be arranged directly below each liquid ejection head unit (directly below the landing position of each liquid ejection head unit), for example. In the following, an example case where the sensor is installed directly below each liquid ejection head unit is described. By installing the sensor directly below each liquid ejection head unit, the senor may be able to accurately detect an amount of movement directly below its installation position. Thus, if control operations can be promptly performed, the sensor is preferably located closer to a position directly below each liquid ejection head unit. Note, however, that the sensor installation position is not limited to a position directly below each liquid ejection head unit, and even in such case, calculation operations similar to those described below may be implemented.

Also, in some embodiments, if errors can be tolerated, the sensor installation position may be located directly below each liquid ejection head unit or at a position further downstream between the first roller and the second roller, for example.

Also, the image forming apparatus 110 may further include a measuring unit such as an encoder. In the following, an example where the measuring unit is implemented by an encoder will be described. More specifically, the encoder may be installed with respect to a rotational axis of the roller 230, for example. In this way, the amount of movement of the web 120 may be measured based on the amount of rotation of the roller 230, for example. By using the measurement result obtained by the encoder together with the detection result obtained by the sensor, the image forming apparatus 110 may be able to more accurately eject liquid onto the web 120, for example.

<Control Unit>

The controller 520 of FIG. 2, as an example of a control unit, may have a configuration as described below, for example.

Figure 7:
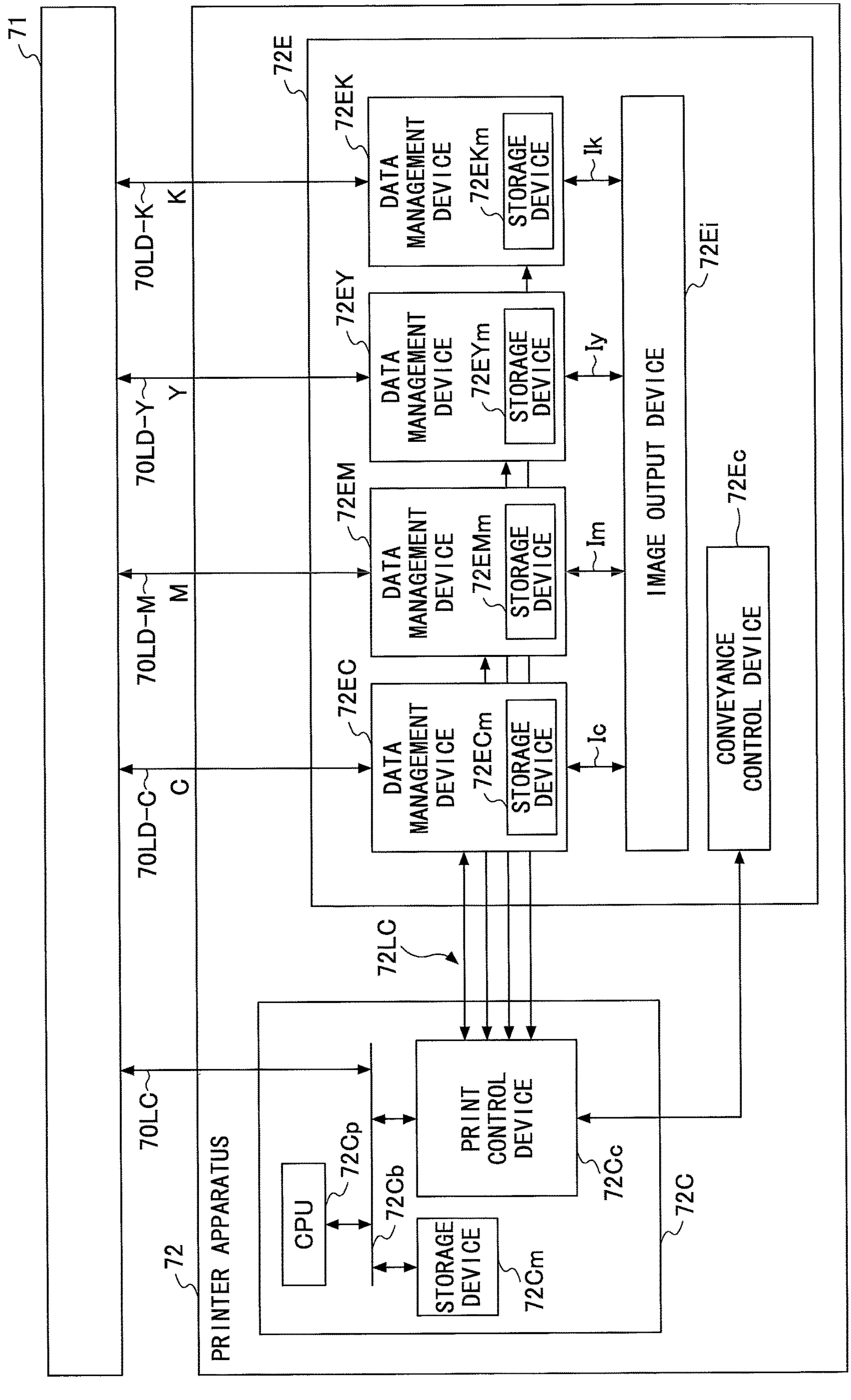
FIG. 7 is a block diagram illustrating an example hardware configuration of a control unit according to an embodiment of the present invention.

FIG. 7 is a block diagram illustrating an example hardware configuration of a control unit according to an embodiment of the present invention. For example, the controller 520 includes a host apparatus 71, which may be an information processing apparatus, and a printer apparatus 72. In the illustrated example, the controller 520 causes the printer apparatus 72 to form an image on a recording medium based on image data and control data input by the host apparatus 71.

The host apparatus 71 may be a PC (Personal Computer), for example. The printer apparatus 72 includes a printer controller 72C and a printer engine 72E.

The printer controller 72C controls the operation of the printer engine 72E. The printer controller 72C transmits/receives control data to/from the host apparatus 71 via a control line 70LC. Also, the printer controller 72C transmits/receives control data to/from the printer engine 72E via a control line 72LC. When various printing conditions indicated by the control data are input to the printer controller 72C by such transmission/reception of control data, the printer controller 72C stores the printing conditions using a register, for example. Then, the printer controller 72C controls the printer engine 72E based on the control data and forms an image based on print job data, i.e., the control data.

The printer controller 72C includes a CPU 72Cp, a print control device 72Cc, and a storage device 72Cm. The CPU 72Cp and the print control device 72Cc are connected by a bus 72Cb to communicate with each other. Also, the bus 72Cb may be connected to the control line 70LC via a communication I/F (interface), for example.

The CPU 72Cp controls the overall operation of the printer apparatus 72 based on a control program, for example. That is, the CPU 72Cp may implement functions of a computing device and a control device.

The print control device 72Cc transmits/receives data indicating a command or a status, for example, to/from the printer engine 72E based on the control data from the host apparatus 71. In this way, the print control device 72Cc controls the printer engine 72E. Note that the image storage units 15A and 15B of the detection units 52A and 52B as illustrated in FIG. 6 may be implemented by the storage device 72Cm, for example. Also, the calculating unit 53F may be implemented by the CPU 72Cp, for example. However, the image storage units 15A and 15B and the calculating unit 53F may also be implemented by some other computing device and storage device.

The printer engine 72E is connected to a plurality of data lines 70LD-C, 70LD-M, 70LD-Y, and 70LD-K. The printer engine 72E receives image data from the host apparatus 71 via the plurality of data lines. Then, the printer engine 72E forms an image in each color under control by the printer controller 72C.

The printer engine 72E includes a plurality of data management devices 72EC, 72EM, 72EY, and 72EK. Also, the printer engine 72E includes an image output device 72Ei and a conveyance control device 72Ec.

Figure 8:
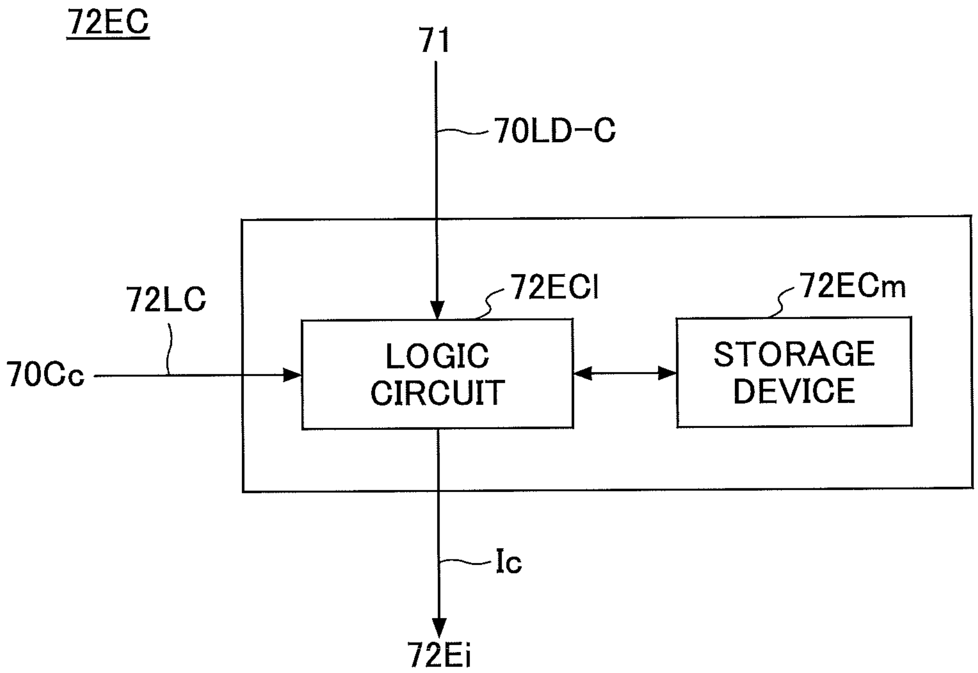
FIG. 8 is a block diagram illustrating an example hardware configuration of a data management device included in the control unit according to an embodiment of the present invention.

FIG. 8 is a block diagram illustrating an example hardware configuration of the data management device of the control unit according to an embodiment of the present invention. For example, the plurality of data management devices 72EC, 72EM, 72EY, and 72EK may have the same configuration. In the following, it is assumed that the data management devices 72EC, 72EM, 72EY, and 72EK have the same configuration, and the configuration of the data management apparatus 72EC is described as an example. Thus, overlapping descriptions will be omitted.

The data management device 72EC includes a logic circuit 72EC1 and a storage device 72ECm. As illustrated in FIG. 8, the logic circuit 72EC1 is connected to the host apparatus 71 via a data line 70LD-C. Also, the logic circuit 72EC1 is connected to the print control device 72Cc via the control line 72LC. Note that the logic circuit 72EC1 may be implemented by an ASIC (Application Specific Integrated Circuit) or a PLD (Programmable Logic Device), for example.

Based on a control signal input by the printer controller 72C (FIG. 7), the logic circuit 72EC1 stores image data input by the host apparatus 71 in the storage device 72ECm.

Also, the logic circuit 72EC1 reads cyan image data Ic from the storage device 72ECm based on the control signal input from the printer controller 72C. Then, the logic circuit 72EC1 sends the read cyan image data Ic to the image output device 72Ei.

Note that the storage device 72ECm preferably has a storage capacity for storing image data of about three pages or more, for example. By configuring the storage device 72ECm to have a storage capacity for storing image data of about three pages or more, the storage device 72ECm may be able to store image data input by the host apparatus 71, image data of an image being formed, and image data for forming a next image, for example.

Figure 9:
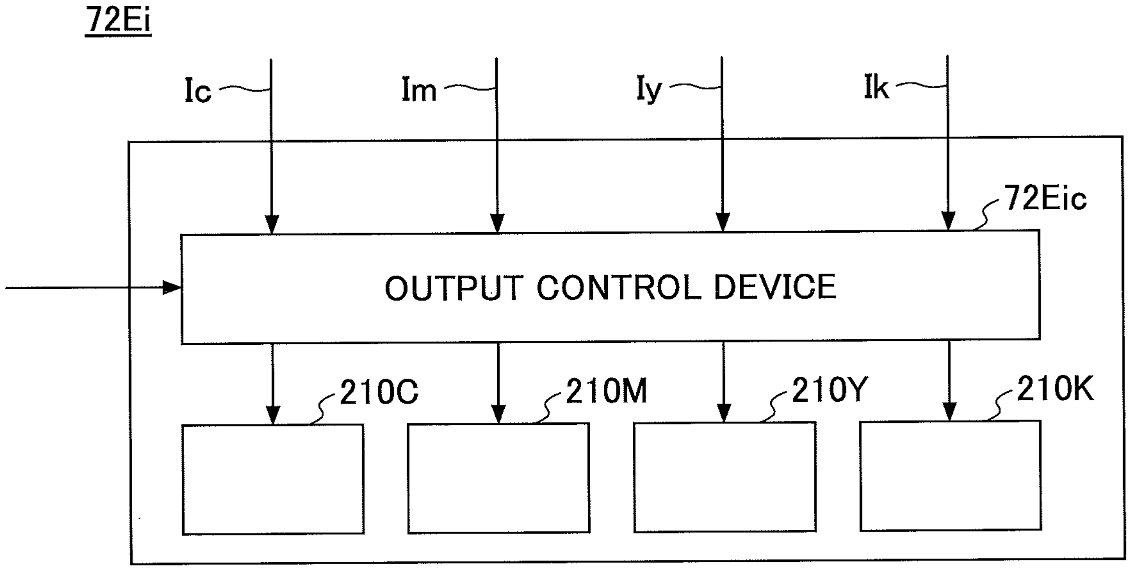
FIG. 9 is a block diagram illustrating an example hardware configuration of an image output device included in the control unit according to an embodiment of the present invention.

FIG. 9 is a block diagram illustrating an example hardware configuration of the image output device 72Ei included in the control unit according to an embodiment of the present invention. As illustrated in FIG. 9, the image output device 72Ei includes an output control device 72Eic and the plurality of liquid ejection head units, including the black liquid ejection head unit 210K, the cyan liquid ejection head unit 210C, the magenta liquid ejection head unit 210M, and the yellow liquid ejection head unit 210Y.

The output control device 72Eic outputs image data of each color to the corresponding liquid ejection head unit for the corresponding color. That is, the output control device 72Eic controls the liquid ejection head units for the different colors based on image data input thereto.

Note that the output control device 72Eic may control the plurality of liquid ejection head units simultaneously or individually. That is, for example, upon receiving a timing input, the output control device 72Eic may perform timing control for changing the ejection timing of liquid to be ejected by each liquid ejection head unit. Note that the output control device 72Eic may control one or more of the liquid ejection head units based on a control signal input by the printer controller 72C (FIG. 7), for example. Also, the output control device 72Eic may control one or more of the liquid ejection head units based on an operation input by a user, for example.

Note that the printer apparatus 72 illustrated in FIG. 7 is an example printer apparatus having two distinct paths including one path for inputting image data from the host apparatus 71 and another path used for transmission/reception of data between the host apparatus 71 and the printer apparatus 72 based on control data.

Also, note that the printer apparatus 72 may be configured to form an image using one color, such as black, for example. In the case where the printer apparatus 72 is configured to form an image with only black, for example, the printer engine 72E may include one data management device and four black liquid ejection head units in order to increase image forming speed, for example. In this way, black ink may be ejected from a plurality of black liquid ejection head units such that image formation may be accelerated as compared with a configuration including only one black liquid ejection head unit, for example.

The conveyance control device 72Ec (FIG. 7) may include a motor, a mechanism, and a driver device for conveying the web 120. For example, the conveyance control device 72Ec may control a motor connected to each roller to convey the web 120.

<Correlation Calculation>

Figure 10:
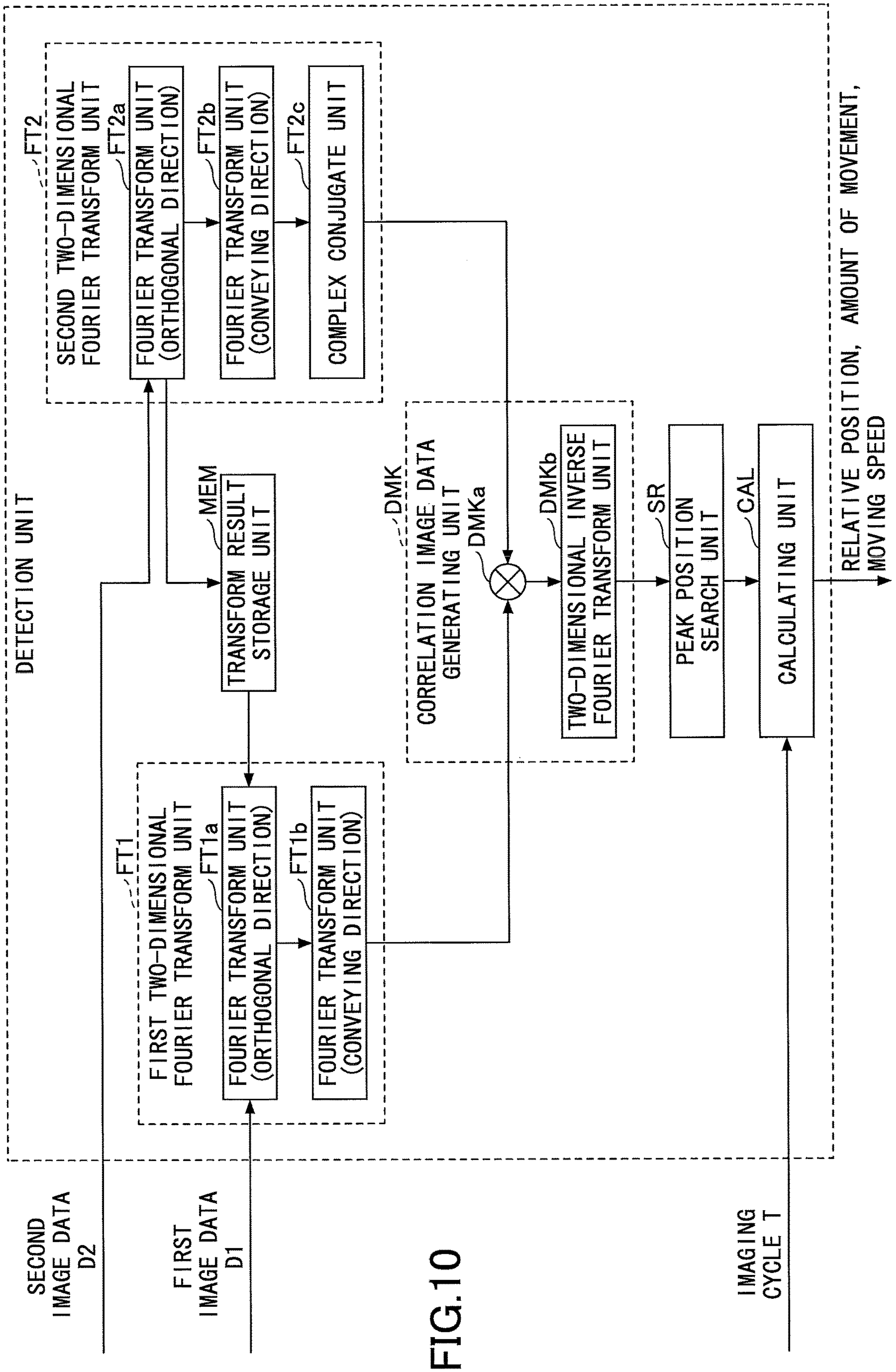
FIG. 10 is a block diagram illustrating an example correlation calculation method according to an embodiment of the present invention.

FIG. 10 is a diagram illustrating an example correlation calculation method implemented by the detection unit according to an embodiment of the present invention. For example, the detection unit may perform a correlation calculation operation as illustrated in FIG. 10 to calculate the relative position, the amount of movement, and/or the moving speed of the web 120.

In the example illustrated in FIG. 10, the detection unit includes a first two-dimensional Fourier transform unit FT1, a second two-dimensional Fourier transform unit FT2, a correlation image data generating unit DMK, a peak position search unit SR, a calculating unit CAL, and a transform result storage unit MEM.

The first two-dimensional Fourier transform unit FT1 transforms first image data D1. Specifically, the first two-dimensional Fourier transform unit FT1 includes a Fourier transform unit FT1*a* for the orthogonal direction and a Fourier transform unit FT1*b* for the conveying direction.

The Fourier transform unit FT1*a* for the orthogonal direction applies a one-dimensional Fourier transform to the first image data D1 in the orthogonal direction. Then, the Fourier transform unit FT1*b* for the conveying direction applies a one-dimensional Fourier transform to the first image data D1 in the conveying direction based on the transform result obtained by the Fourier transformation unit FT1*a* for the orthogonal direction. In this way, the Fourier transform unit FT1*a* for the orthogonal direction and the Fourier transform unit FT1*b* for the conveying direction may respectively apply one-dimensional Fourier transforms in the orthogonal direction and the conveying direction. The first two-dimensional Fourier transform unit FT1 then outputs the transform result to the correlation image data generating unit DMK.

Similarly, the second two-dimensional Fourier transform unit FT2 transforms second image data D2. Specifically, the second two-dimensional Fourier transform unit FT2 includes a Fourier transform unit FT2*a* for the orthogonal direction, a Fourier transform unit FT2*b* for the conveying direction, and a complex conjugate unit FT2*c*.

The Fourier transform unit FT2*a* for the orthogonal direction applies a one-dimensional Fourier transform to the second image data D2 in the orthogonal direction. Then, the Fourier transformation unit FT2*b* for the conveying direction applies a one-dimensional Fourier transformation to the second image data D2 in the conveying direction based on the transform result obtained by the Fourier transformation unit FT2*a* for the orthogonal direction. In this way, the Fourier transform unit FT2*a* for the orthogonal direction and the Fourier transform unit FT2*b* for the conveying direction may respectively apply one-dimensional Fourier transforms in the orthogonal direction and the conveying direction.

Then, the complex conjugate unit FT2*c* calculates the complex conjugate of the transform results obtained by the Fourier transform unit FT2*a* for the orthogonal direction and the Fourier transform unit FT2*b* for the conveying direction. Then, the second two-dimensional Fourier transform unit FT2 outputs the complex conjugate calculated by the complex conjugate unit FT2*c* to the correlation image data generating unit DMK.

Then, the correlation image data generating unit DMK generates correlation image data based on the transform result of the first image data D1 output by the first two-dimensional Fourier transform unit FT1 and the transform result of the second image data D2 output by the second two-dimensional Fourier transform unit FT2.

The correlation image data generating unit DMK includes an integration unit DMKa and a two-dimensional inverse Fourier transform unit DMKb.

The integration unit DMKa integrates the transform result of the first image data D1 and the transform result of the second image data D2. The integration unit DMKa then outputs the integration result to the two-dimensional inverse Fourier transform unit DMKb.

The two-dimensional inverse Fourier transform unit DMKb applies a two-dimensional inverse Fourier transform to the integration result obtained by the integration unit DMKa. By applying the two-dimensional inverse Fourier transform to the integration result in the above-described manner, correlation image data may be generated. Then, the two-dimensional inverse Fourier transform unit DMKb outputs the generated correlation image data to the peak position search unit SR.

The peak position search unit SR searches the generated correlation image data to find a peak position of a peak luminance (peak value) with a steepest rise and fall. That is, first, a value indicating the intensity of light, i.e., luminance, is input to the correlation image data. Also, the luminance is input in the form of a matrix.

In the correlation image data, the luminance is arranged at intervals of the pixel pitch (pixel size) of an area sensor. Thus, the search for the peak position is preferably performed after the so-called sub-pixel processing is performed. By performing the sub-pixel processing, the peak position may be searched with high accuracy. In this way, the detection unit may be able to accurately output the relative position, the amount of movement, and/or the moving speed of the web 120, for example.

Note that the search by the peak position search unit SR may be implemented in the following manner, for example.

Figure 11:
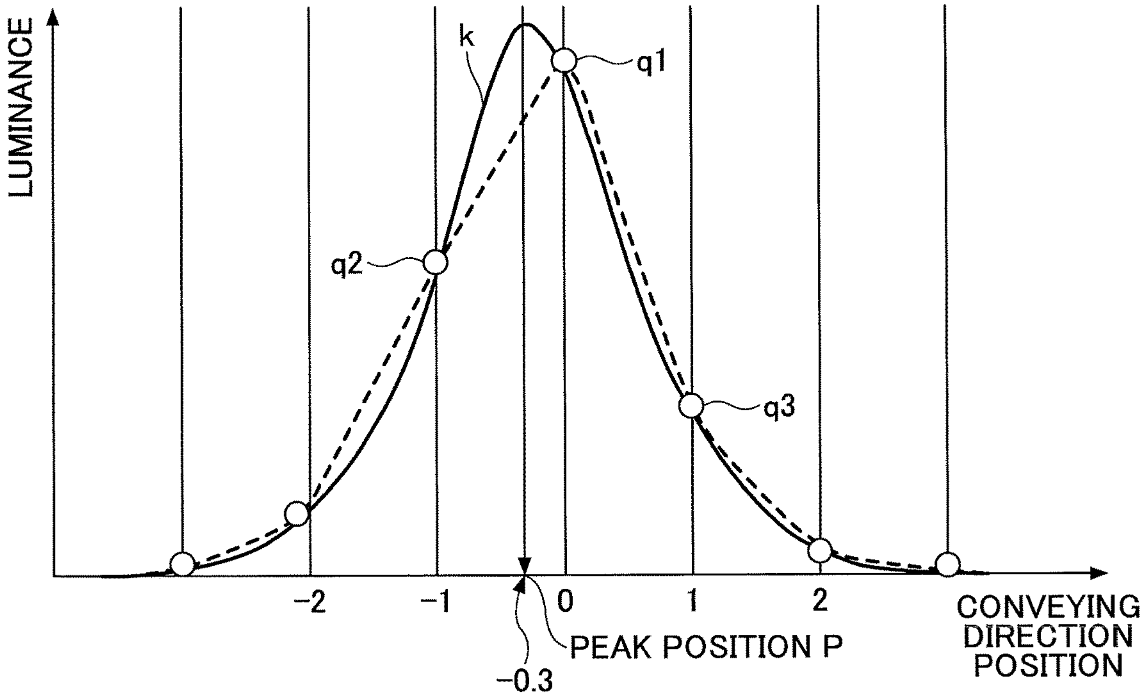
FIG. 11 is a diagram illustrating an example method for searching a peak position in the correlation calculation according to an embodiment of the present invention.

FIG. 11 is a diagram illustrating an example peak position search method that may be implemented in the correlation calculation according to an embodiment of the present invention. In the graph of FIG. 11, the horizontal axis indicates a position in the conveying direction of an image represented by the correlation image data. The vertical axis indicates the luminance of the image represented by the correlation image data.

In the following, an example using three data values, i.e., first data value q1, second data value q2, and third data value q3, of the luminance values indicated by the correlation image data will be described. That is, in this example, the peak position search unit SR (FIG. 10) searches for a peak position P on a curve k connecting the first data value q1, the second data value q2, and the third data value q3.

First, the peak position search unit SR calculates differences in luminance of the image represented by the correlation image data. Then, the peak position search unit SR extracts a combination of data values having the largest difference value from among the calculated differences. Then, the peak position search unit SR extracts combinations of data values that are adjacent to the combination of data values with the largest difference value. In this way, the peak position search unit SR can extract three data values, such as the first data value q1, the second data value q2, and the third data value q3, as illustrated in FIG. 11. Then, by obtaining the curve k by connecting the three extracted data values, the peak position search unit SR may be able to search for the peak position P. In this way, the peak position search unit SR may be able to reduce the calculation load for operations such as sub-pixel processing and search for the peak position P at higher speed, for example. Note that the position of the combination of data values with the largest difference value corresponds to the steepest position. Also, note that sub-pixel processing may be implemented by a process other than the above-described process.

When the peak position search unit SR searches for a peak position in the manner described above, the following calculation result may be obtained, for example.

Figure 12:
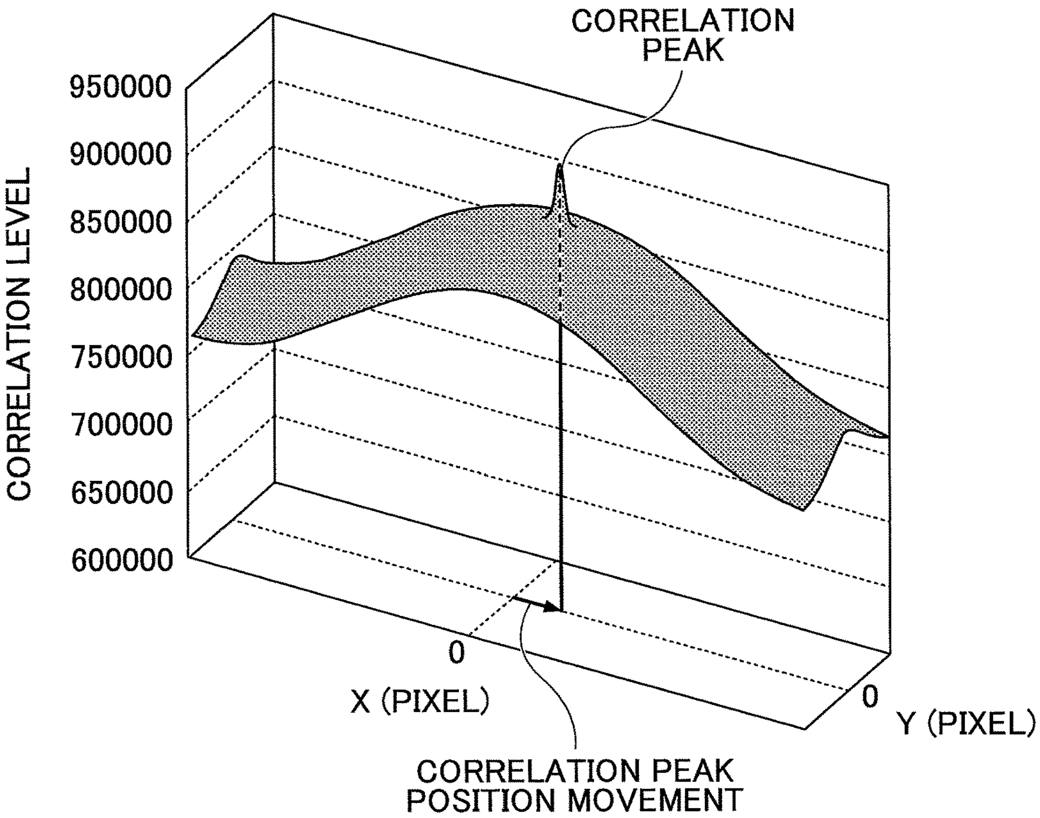
FIG. 12 is a diagram illustrating an example result of the correlation calculation according to an embodiment of the present invention.

FIG. 12 is a diagram illustrating an example calculation result of the correlation calculation according to an embodiment of the present invention. FIG. 12 indicates a correlation level distribution of a cross-correlation function. In FIG. 12, the X-axis and the Y-axis indicate serial numbers of pixels. The peak position search unit SR (FIG. 10) searches the correlation image data to find a peak position, such as "correlation peak" as illustrated in FIG. 12, for example.

Note that the illustrated example describes a case where variations occur in the Y direction. However, variations may also occur in the X direction, and in this case, a peak position that is shifted in the X direction may also occur.

Referring back to FIG. 10, the calculating unit CAL may calculate the relative position, the amount of movement, and/or the moving speed of the web 120, for example. Specifically, the calculating unit CAL may calculate the relative position and the amount of movement of the web 120 by calculating the difference between a center position of the correlation image data and the peak position identified by the peak position search unit SR, for example.

Also, the calculating unit CAL may calculate the moving speed by dividing the amount of movement by time, for example.

As described above, by performing the correlation calculation, the detection unit may be able to detect the relative position, the amount of movement, and/or the moving speed of the web 120, for example. Note, however, that method of detecting the relative position, the amount of movement, and the moving speed is not limited to the above-described method. For example, the detection unit may also detect the relative position, the amount of movement, and/or the moving speed in the manner as described below.

First, the detection unit binarizes the first image data and the second image data based on their luminance. In other words, the detection unit sets a luminance to "0" if the luminance is less than or equal to a preset threshold value, and sets a luminance to “1” if the luminance is greater than the threshold value. By comparing the binarized first image data and binarized second image data, the detection unit may detect the relative position, for example.

Note that the detection unit may detect the relative position, the amount of movement, and/or the moving speed using other detection methods as well. For example, the detection unit may detect the relative position based on patterns captured in two or more sets of image data using a so-called pattern matching process.

<Overall Process>

Figure 13:
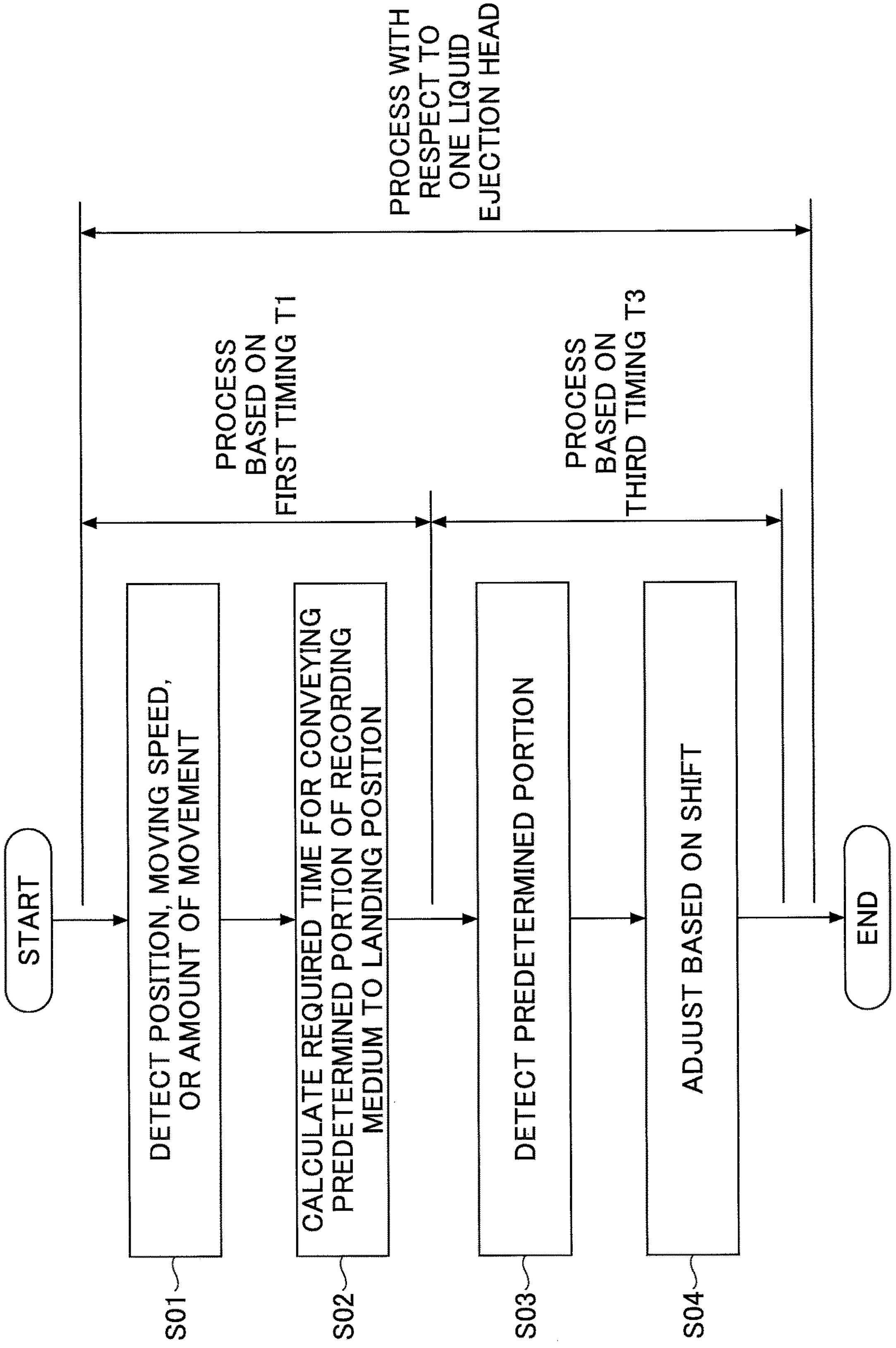
FIG. 13 is a flowchart illustrating an example overall process implemented by the liquid ejection apparatus according to an embodiment of the present invention.

FIG. 13 is a flowchart illustrating an example overall process implemented by the liquid ejection apparatus according to an embodiment of the present invention. For example, in the process described below, it is assumed that image data representing an image to be formed on the web 120 (FIG. 1) is input to the image forming apparatus 110 in advance. Then, based on the input image data, the image forming apparatus 110 may perform the process as illustrated in FIG. 13 to form the image represented by the image data on the web 120.

Note that FIG. 13 illustrates a process that is implemented with respect to one liquid ejection head unit. For example, FIG. 13 may represent a process implemented with respect to the black liquid ejection head unit 210K of FIG. 2. The process of FIG. 13 may be separately implemented for the other liquid ejection head units for the other colors in parallel or before/after the process of FIG. 13 that is implemented with respect to the black liquid ejection head unit 210K.

In step S01, the image forming apparatus 110 detects the position, the moving speed, and/or the amount of movement of a recording medium. That is, in step S01, the image forming apparatus 110 detects the position, the moving speed, and/or the amount of movement of the web 120 using a sensor.

For example, in step S01, the image forming apparatus 110 may detect the position, the moving speed, and/or the amount of movement of the web 120 by implementing the correlation calculation as illustrated in FIG. 10.

In step S02, the image forming apparatus 110 calculates the required time for conveying a portion of the web 120 on which an image is to be formed to a landing position.

For example, the required time for conveying the web 120 by a specified amount (distance) may be detected by the sensor on the upstream side, such as the black sensor SENK (FIG. 2). Based on the detection result obtained by the black sensor SENK, the ejection timing for the black liquid ejection head unit 210K may be generated. When the ejection timing for the black liquid ejection head unit 210K is generated, the detection result obtained by the black sensor SENK may be integrated in the detections made by the downstream side sensors, such as the cyan sensor SENC (FIG. 2). For example, like the black sensor SENK, the cyan sensor SENC may detect the required time for conveying the web 120 by the specified amount. Then, the ejection timing for the cyan liquid ejection head unit 210C may be corrected based on the detection result, for example. Note that similar process operations may be performed by the sensors installed further downstream, such as the magenta sensor SENM and the yellow sensor SENY.

Also, in some embodiments, the required time for conveying the web 120 may be calculated by the following method, for example. First, it is assumed that the distance from the sensor installation position to the landing position is input in advance. Also, it is assumed that the predetermined portion of the web 120 may be determined based on image data, for example. In step S01, the image forming apparatus 110 detects the moving speed of the web 120. Then, in step S02, the required time for conveying the predetermined portion of the web 120 to the landing position can be calculated by “distance÷movement speed=time”.

Note that the processes of steps S01 and S02 are performed with respect to a preceding landing position based on the liquid ejection timing of a preceding liquid ejection head unit (e.g., black liquid ejection head unit 210K coming before the cyan liquid ejection head unit 210C). On the other hand, step S03 is a process performed at the installation position of a sensor arranged downstream of the preceding landing position (e.g., cyan sensor SENC arranged downstream of the black landing position PK). In the following descriptions, the liquid election timing of a preceding liquid ejection head unit (e.g., black liquid ejection head unit 210K coming before the cyan liquid ejection head unit 210C) is referred to as “first timing T1”. On the other hand, the liquid ejection timing of a next liquid ejection head unit (e.g. cyan liquid ejection head unit 210C coming after the black liquid ejection head unit 210K) is referred to as “second timing T2”. Further, the detection timing of a sensor that performs a detection process between the first timing T1 and the second timing T2 is referred to as “third timing T3”.

In step S03, the image forming apparatus 110 detects the predetermined portion of the web 120. Note that the detection process of step S03 it performed at the third timing T3.

Then, in step S04, the image forming apparatus 110 calculates a shift based on the detection result obtained in step S03, and adjusts the liquid ejection timing of liquid to be ejected onto the next landing position (i.e., the second timing T2) based on the calculated shift.

The above overall process is described below with reference to a timing chart.

Figure 14:
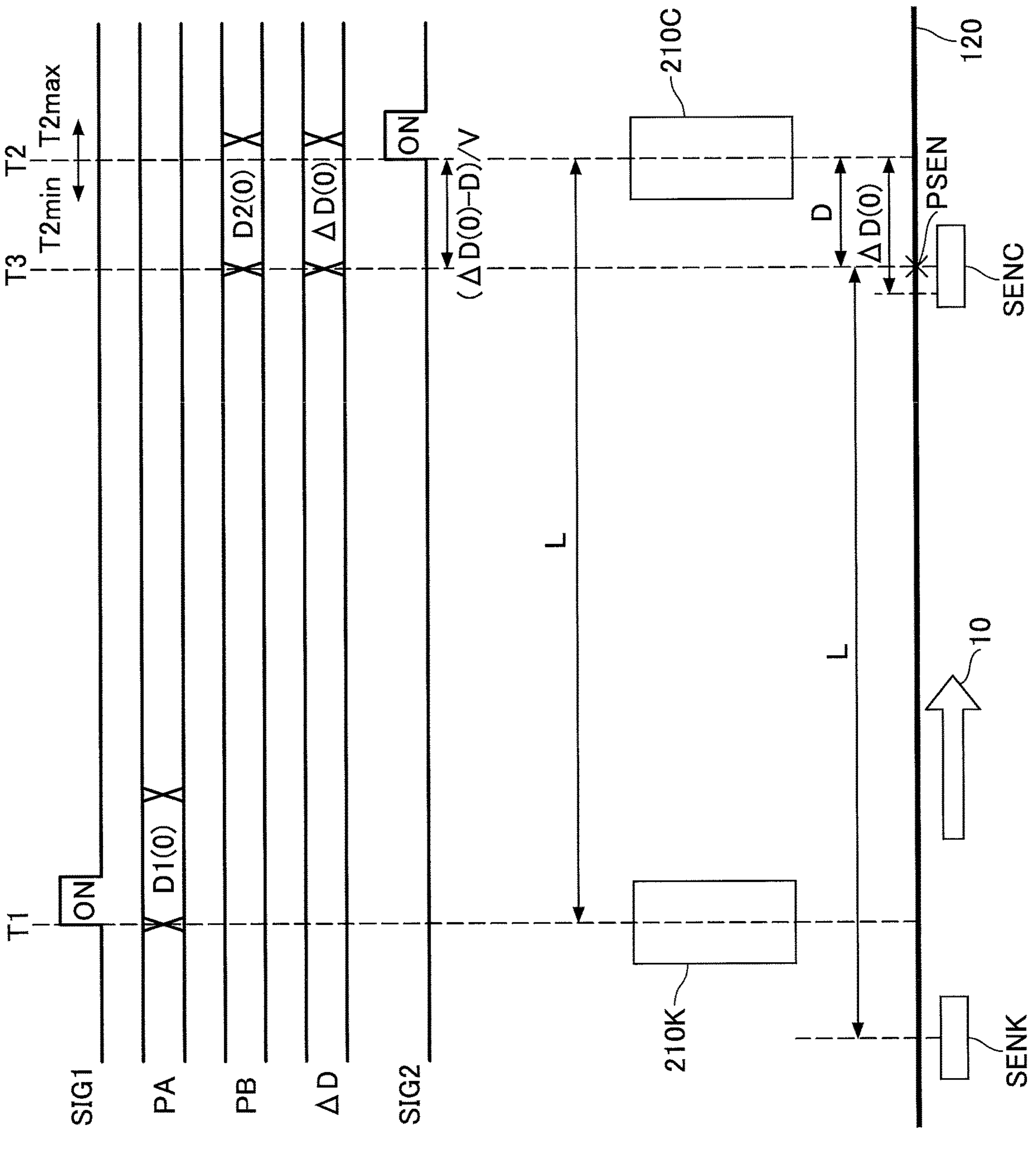
FIG. 14 is a conceptual diagram including a timing chart of the overall process implemented by the liquid ejection apparatus according to an embodiment of the present invention.

FIG. 14 is a conceptual diagram including a timing chart that illustrates an example implementation of the overall process of the liquid ejection apparatus according to an embodiment of the present invention. Note that FIG. 14 illustrates an example case where the first timing T1 corresponds to the liquid ejection timing of the black liquid ejection head unit 210K and the second timing T2 corresponds to the liquid ejection timing of the cyan liquid ejection head unit 210C. Also, in the present example, the third timing T3 corresponds to the detection timing of the cyan sensor SENC that is arranged between the black liquid ejection head unit 210K and the cyan liquid ejection head unit 210C.

Note that in the example of FIG. 14, the position at which the cyan sensor SENC performs a detection process is referred to as “detection position PSEN”. As shown in FIG. 14, the detection position PSEN is at an “installation distance D” apart from the landing position of the cyan liquid ejection head unit 210C. Also, in the present example, the interval at which the sensors are installed is the same as the installation interval (relative distance L) of the liquid ejection head units.

At the first timing T1, the image forming apparatus 110 switches the first signal SIG1 to “ON” to control the black liquid ejection head unit 210K to eject liquid. The image forming apparatus 110 acquires image data at the time the first signal SIG1 is switched “ON”. In the illustrated example, the image data acquired at the first timing T1 is represented by a first image signal PA, and the acquired image data corresponds to the image data D1($n$) at the “position A” of FIG. 6.

When the image data D1 is acquired, the image forming apparatus 110 can detect the position of a predetermined portion of the web 120 and the moving speed V at which the web 120 is conveyed, for example (step S01 of FIG. 13). When the moving speed V is detected, the image forming apparatus 110 can calculate the required time for conveying the predetermined portion of the web 120 to the next landing position by dividing the relative distance L by the moving speed V (L÷V) (step S02 of FIG. 13).

Then, at the third timing T3, the image forming apparatus 110 acquires image data. In the illustrated example, the image data acquired at the third timing T3 is represented by a second image signal PB, and the acquired image data corresponds to the image data D2(*n*) at "position B" of FIG. 6 (step S03 of FIG. 13). Then, the image forming apparatus 110 performs cross-correlation calculation with respect to the image data D1(*n*) and D2(*n*). In this way, the image forming apparatus 110 can calculate the shift ΔD(0).

In a so-called ideal state where no thermal expansion of the rollers occurs and no slippage between the rollers and the web 120 occurs, the time it takes for the image forming apparatus 110 to convey the predetermined portion of the web 120 the relative distance L at the moving speed V would be "L÷V".

As such, the "imaging cycle T" of FIG. 10 may be set to "imaging cycle T=imaging time difference=relative distance L÷moving speed V", for example. In the illustrated example, the black sensor SENK and the cyan sensor SENC are installed at an interval equal to the relative distance L. If the image forming apparatus 110 is in the so-called ideal state, the predetermined portion of the web 120 detected by the black sensor SENK will be conveyed to the position of the detection position PSEN after the time "L÷V".

On the other hand, in practice, thermal expansion of the rollers and/or slippage between the rollers and the web 120 often occur. When the "imaging cycle T=relative distance L÷moving speed V" is set up in the correlation calculation method of FIG. 10, the difference between the timing at which the image data D1(*n*) is acquired by the black sensor SENK and the timing at which the image data D2(*n*) is acquired by the cyan sensor SENC will be "L÷V". In this way, the image forming apparatus 110 may calculate the shift ΔD(0) by setting "L÷V" as the "imaging cycle T". In the following, an example manner of setting the third timing T3 is described.

At the third timing T3, the image forming apparatus 110 calculates the shift ΔD(0). Then, the image forming apparatus 110 adjusts the timing at which the cyan liquid ejection head unit 210C ejects liquid (i.e., second timing T2) based on the installation distance D, the shift ΔD(0), and the moving speed V (step S04 of in FIG. 13).

In the so-called ideal state where no thermal expansion of the rollers and/or slippage between the rollers and the web 120 occurs, the time it takes for the image forming apparatus 110 to convey the predetermined portion of the web 120 the installation distance D at the moving speed V would be "D÷V". As such, in step S02, the second timing T2 may be determined by calculating the time "D÷V" based on the time "L÷V". On the other hand, in practice, due to thermal expansion of the rollers, for example, the position onto which liquid is to be ejected may be shifted by ΔD(0) from the position at which the cyan liquid ejection head unit 210C ejects liquid. Therefore, it may take time "ΔD(0)÷V" to convey the predetermined portion of the web 120 to the position where the cyan liquid ejection head unit 210C ejects liquid. As such, the image forming apparatus 110 adjusts the second timing T2, that is, the timing at which the second signal SIG2 is switched "ON", from the timing determined based on the time "L÷V" (for the ideal state) based on the shift ΔD(0).

Specifically, the image forming apparatus 110 calculates "(ΔD(0)−D)/V" as the amount of adjustment to be made to the second timing T2. That is, the image forming apparatus 110 adjusts the second timing T2 to be shifted by "(ΔD(0)−D)/V". In this way, even if thermal expansion of the rollers occurs, for example, the image forming apparatus 110 can make appropriate adjustments to the second timing T2 based on the shift ΔD(0), the installation distance D, and the moving speed V, so that the accuracy of the landing position of ejected liquid in the conveying direction can be further improved.

Note that the timing at which detection is performed, that is, the third timing T3, is preferably determined based on the minimum time required for conveying the web 120 to the position at which the liquid ejection head unit ejects liquid (hereinafter simply referred to as "minimum time"), for example. That is, because thermal expansion of the rollers may vary depending on circumstances, there are variations in the time it takes to convey the web 120 to the position at which the liquid ejection head unit ejects liquid (landing position). Thus, a user may measure the time it takes to convey the web 120 to the landing position a plurality of times in advance to determine the shortest time measured and set the shortest time as the minimum time, for example. In this way, the minimum time may be determined in advance.

Then, it is assumed that the predetermined portion of the web 120 is conveyed to the detection position in the minimum time, and a time before the minimum time for conveying the predetermined portion to the detection position elapses may be set as the third timing T3 in the image forming apparatus 110. The web 120 may possibly be conveyed in the minimum time, and as such, if detection is not performed before the predetermined portion is conveyed in the minimum time, the predetermined portion may be overlooked. By setting the third timing T3 based on the minimum time as described above, the image forming apparatus may be able to perform detection with high accuracy.

Also, in some embodiments, the image forming apparatus 110 may have an ideal moving speed for each mode set up in advance, for example. The ideal moving speed is a moving speed in an ideal state free of thermal expansion of the rollers and the like. Also, note that the "installation distance D" is determined in advance by design. Thus, the image forming apparatus 110 may set the ideal moving speed to "V", calculate "D/V", and determine the timing at which liquid is to be ejected in the ideal state. Then, after determining the shift ΔD(0), the image forming apparatus 110 can adjust the liquid ejection timing in the ideal state based on the shift ΔD(0) and determine the timing at which the liquid discharge head unit is to be controlled to eject liquid, for example.

When a signal is transmitted at the timing adjusted in step S04, the image forming apparatus 110 ejects liquid at the adjusted timing indicated by the signal. By ejecting liquid in this manner, an image represented by image data may be formed on the web 120.

Note that an example case where the image forming apparatus 110 determines the liquid ejection timing based on an amount of adjustment to be made is described above. However, the image forming apparatus 110 may also directly determine the liquid ejection timing of the liquid ejection head unit based on the shift ΔD(0), the moving speed V, and the installation distance D, for example.

<Functional Configuration of Liquid Ejection Apparatus>

Figure 15:
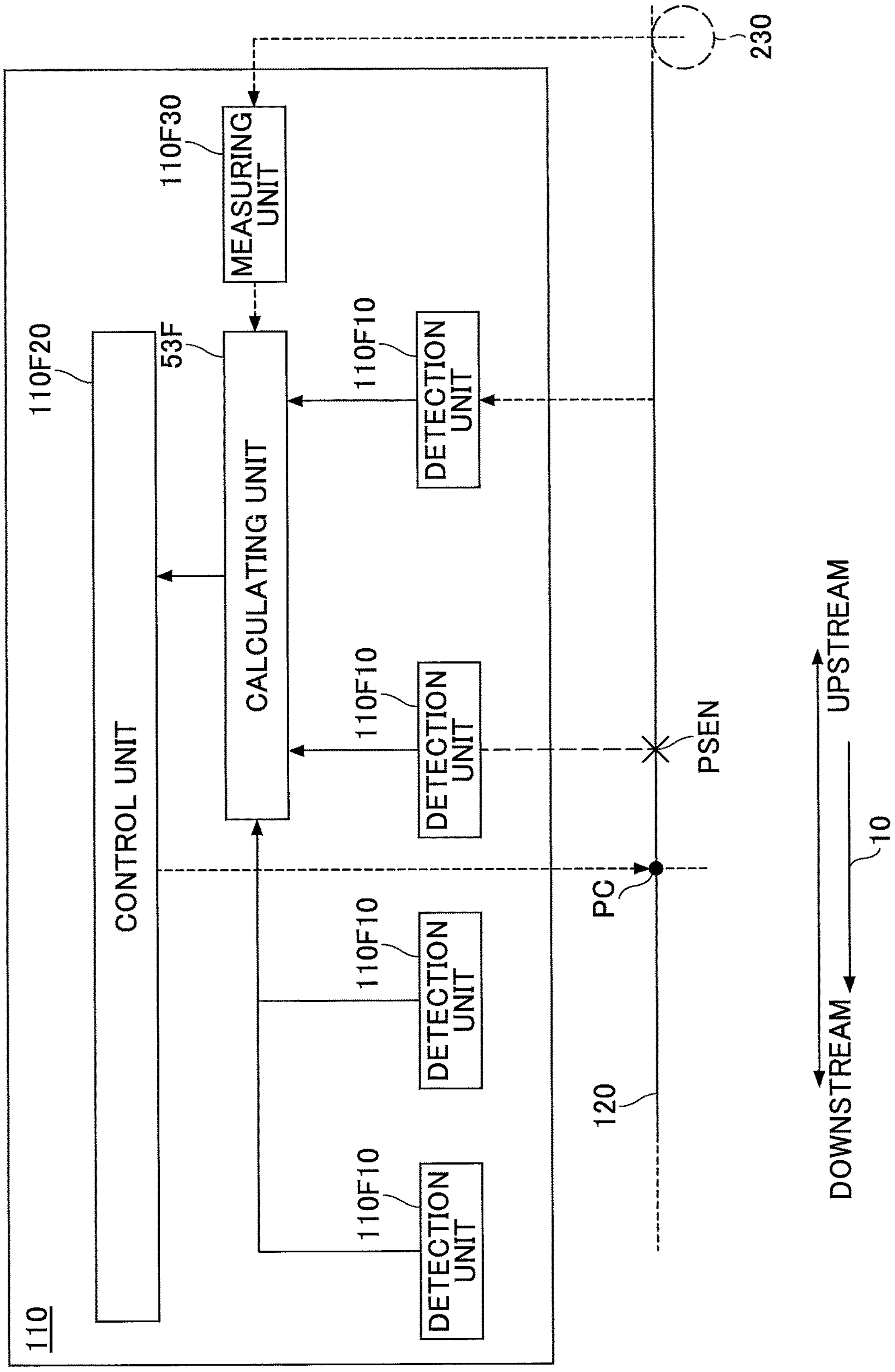
FIG. 15 is a block diagram illustrating an example functional configuration of the liquid ejection apparatus according to an embodiment of the present invention.

FIG. 15 is a block diagram illustrating an example functional configuration of the liquid ejection apparatus according to an embodiment of the present invention. In FIG. 15, the image forming apparatus 110 includes a plurality of liquid ejection head units and a detection unit 110F10 for each of the liquid ejection head units. Further, the image forming apparatus 110 includes a control unit 110F20, a measuring unit 110F30, and the calculating unit 53F.

In FIG. 15, the detection unit 110F10 is provided for each liquid ejection head unit. Specifically, the image forming apparatus 110 having the configuration as illustrated in FIG. 2 would have four detection units 110F10 for the liquid ejection head units 210K, 210C, 210M, and 210Y. The detection unit 110F10 detects the position, the moving speed, and/or the amount of movement of the web 120 (recording medium) in the conveying direction. The detection unit 110F10 may be implemented by the hardware configuration as illustrated in FIG. 4 or 9, for example. Also, the detection unit 110F10 may correspond to the detection units 52A and 52B of FIG. 6, for example.

The calculating unit 53F calculates the time required for conveying a conveyed object, such as the web 120, to a landing position onto which a liquid ejection head unit can eject liquid based on a plurality of detection results. That is, the calculating unit 53F outputs a calculation result that is used by the control unit 110F20 in determining the liquid ejection timing based on a shift, for example.

The control unit 110F20 controls each of the plurality of liquid ejection head units to eject liquid at timings determined making adjustments based on the detection results obtained by the detection units 110F10. The control unit 110F20 may be implemented by the hardware configuration as illustrated in FIG. 7, for example.

Also, the position at which the detection unit 110F10 performs detection, i.e., the sensor installation position, is preferably arranged close to a landing position. For example, the black sensor SENK is preferably arranged close to the black landing position PK, such as somewhere within the range INTK1 between the first roller CR1K and the second roller CR2K. That is, when detection is performed at a position within the range INTK 1, for example, the image forming apparatus 110 may be able to accurately detect the position, the moving speed, and/or the amount of movement of the web 120 in the conveying direction.

More preferably, the position at which the detection unit 110F10 performs detection, i.e., the sensor installation position, may be arranged upstream of the landing position. For example, the black sensor SENK is preferably arranged upstream of the black landing position PK, such as somewhere within the black upstream section INTK2 of the range INTK1 between the first roller CR1K and the second roller CR2K. That is, when the detection is performed within the black upstream section INTK 2, for example, the image forming apparatus 110 may be able to more accurately detect the position, the moving speed, and/or the amount of movement amount of the web 120 in the conveying direction. Also, the image forming apparatus 110 may be able to calculate and generate the liquid ejection timings for the liquid ejection head units based on the detection results of the detection unit 110F10 and control the liquid ejection head units to eject liquid based on the generated liquid ejection timings, for example.

Also, by providing the measuring unit 110F30, the position of a recording medium such as the web 120 may be more accurately detected. For example, a measuring device such as an encoder may be installed at the rotational axis of the roller 230. In such case, the measurement unit 110F30 may measure the amount of movement of the recording medium using the encoder. By using measurements obtained by the measuring unit 110F30 in addition to the detection results obtained by the detection units 110F10, the image forming apparatus 110 may be able to more accurately detect the position of the recording medium in the conveying direction, for example.

COMPARATIVE EXAMPLE

Figure 16:
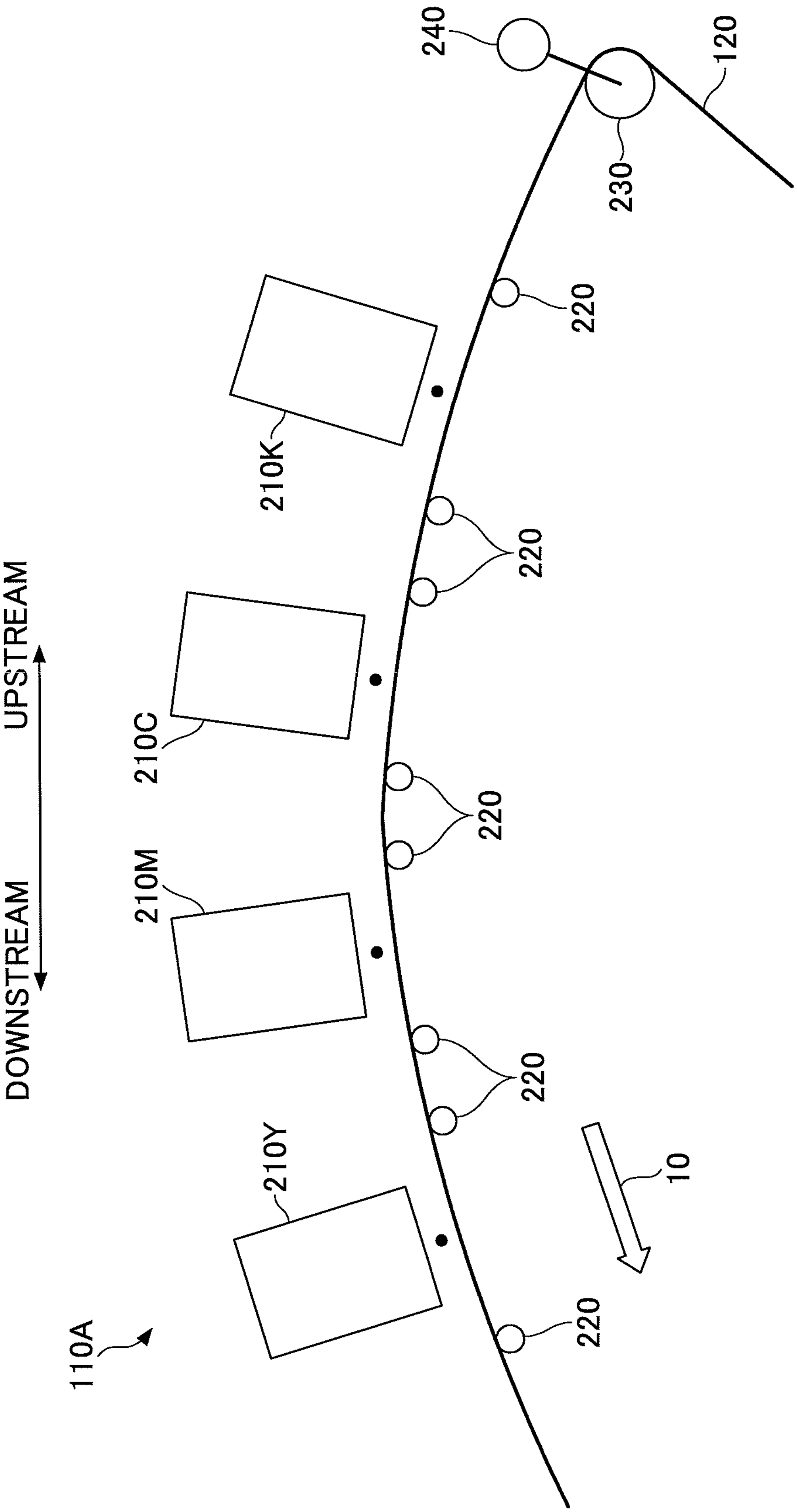
FIG. 16 is a schematic diagram illustrating an example overall configuration of a liquid ejection apparatus according to a comparative example.

FIG. 16 is a schematic diagram illustrating an example overall configuration of an image forming apparatus 110A according to a comparative example. The illustrated image forming apparatus 110A differs from the image forming apparatus 110 illustrated in FIG. 2 in that no sensor is installed and an encoder 240 is installed. Further, in the comparative example, rollers 220 and 230 are provided for conveying the web 120. In the comparative example of FIG. 16, it is assumed that the encoder 240 is installed with respect to the rotational axis of the roller 230.

In the image forming apparatus 110A, the liquid ejection head units 210K, 210C, 210M, and 210Y are arranged at positions spaced apart by distances equal to integer multiples of the circumference of the roller 230 along a conveying path for the web 120. In this way, shifts caused by eccentricity of the roller may be cancelled out by arranging ejection to be in sync with the rotation cycle of the roller, for example. Also, shifts in the installation positions of the liquid ejection head units may be cancelled out by correcting the liquid ejection timings of the liquid ejection head units through test printing, for example.

Also, in the image forming apparatus 110A, the liquid ejection head units are configured to eject liquid based on an encoder signal output by the encoder 240.

Figure 17:
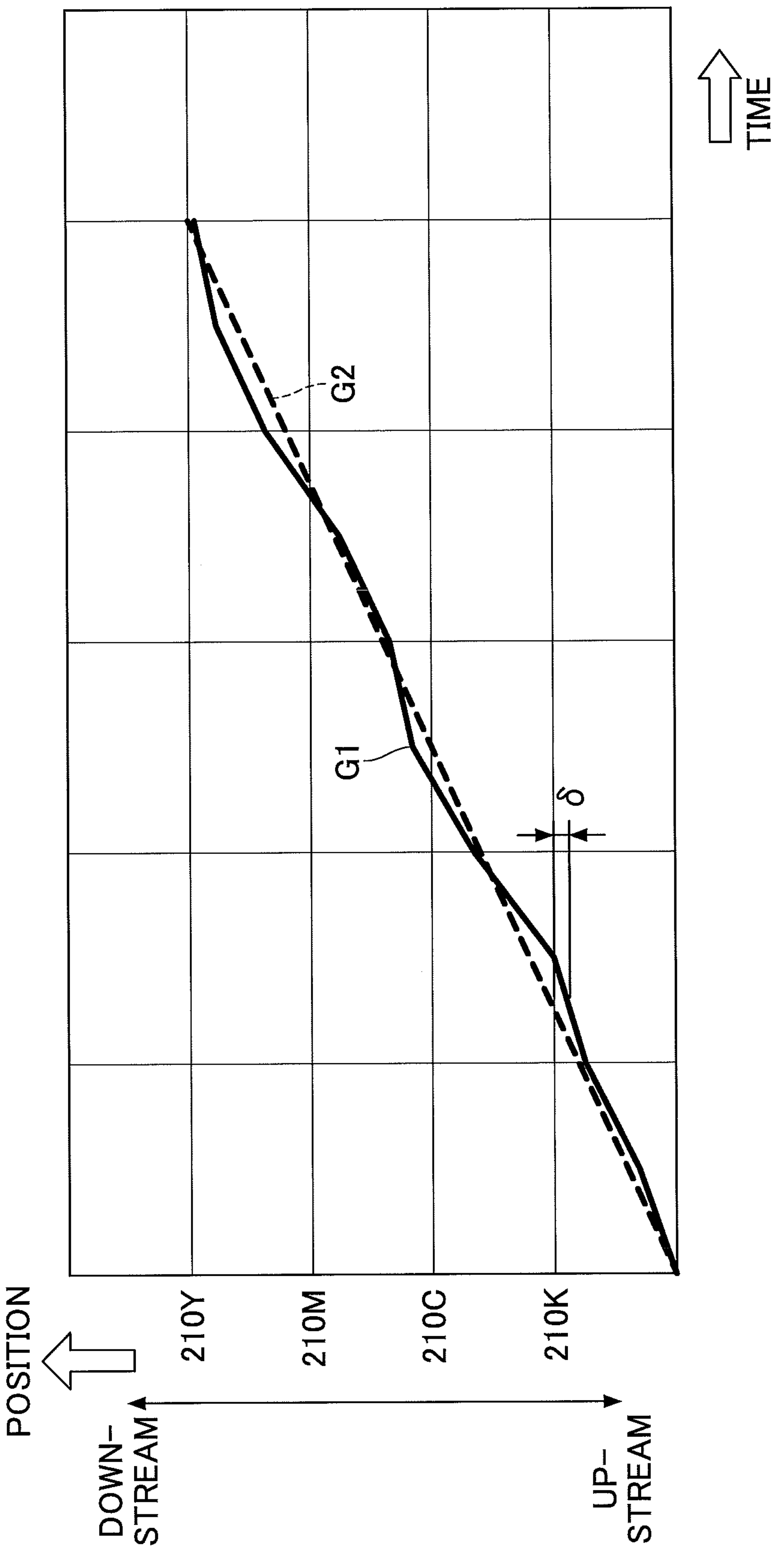
FIG. 17 is a graph illustrating example shifts in the landing positions of ejected liquid occurring in the liquid ejection apparatus according to the comparative example.

FIG. 17 is a graph illustrating example shifts in liquid landing positions that occur in the image forming apparatus 110A according to the comparative example. That is, FIG. 17 illustrates example shifts in the landing positions of liquid ejected by the liquid ejection head units of the image forming apparatus 110A illustrated in FIG. 16.

In FIG. 17, first graph G1 represents an actual position of the web 120. On the other hand, second graph G2 represents a calculated position of the web 120 calculated based on an encoder signal output by the encoder 240 of FIG. 16. As can be appreciated, there are variations in the first graph G1 and the second graph G2. In such case, because the actual position of the web 120 in the conveying direction is different from the calculated position of the web 120, shifts are prone to occur in the landing positions of liquid ejected by the liquid ejection head units.

For example, with respect to the black liquid ejection head unit 210K, the landing position of liquid ejected by the black liquid ejection head unit 210K is shifted by a shift amount σ due to the difference between the actual position and the calculated position of the web 120. Further, the shift amount may be different with respect to each liquid ejection head unit. That is, the shift amount of positional shifts in the liquid landing positions of the other liquid ejection head units are most likely different from the shift amount σ.

The shifts in the liquid landing positions may be caused by eccentricity of the rollers, thermal expansion of the rollers, slippage occurring between the web 120 and the rollers, elongation and contraction of the recording medium, or combinations thereof, for example.

Figure 18:
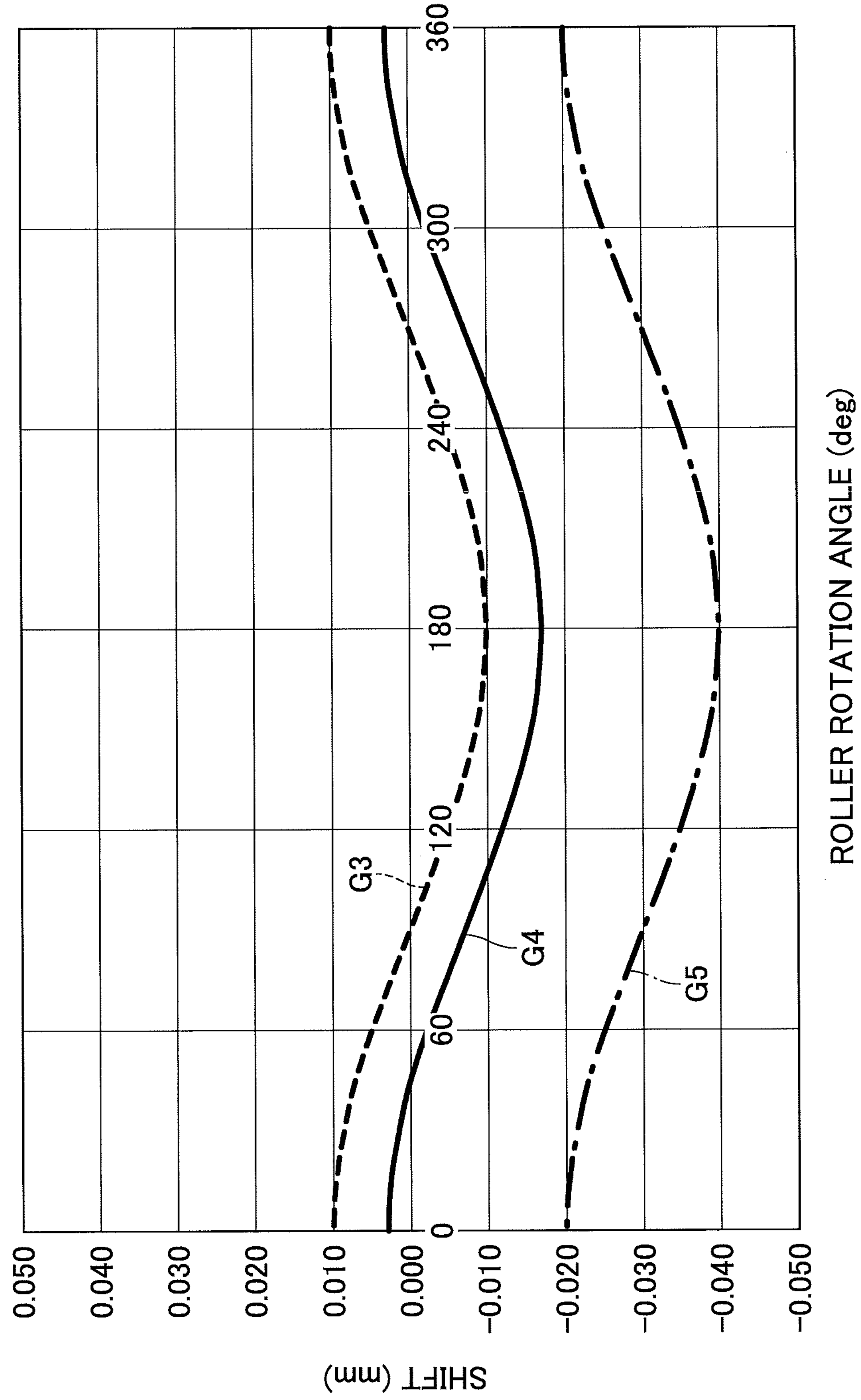
FIG. 18 is a graph illustrating example influences of roller eccentricity, thermal expansion, and slippage on the landing positions of ejected liquid.

FIG. 18 is a graph illustrating example influences of thermal expansion of the rollers, roller eccentricity, and slippage between the rollers and the web 120 on the liquid landing positions. Specifically, the graph of FIG. 18 illustrates example shifts in the liquid landing positions caused by thermal expansion of the rollers, roller eccentricity, and slippage between the rollers and the web 120. That is, each of third through fifth graphs G3-G5 indicates, on the vertical axis, the difference between the actual position of the web 120 and the calculated position of the web 120 calculated based on the encoder signal from the encoder 240 (FIG. 16) as a "shift (mm)" in the liquid landing position. Also, note that FIG. 18 illustrates an example in which the rollers are made of aluminum and has an outer diameter of "φ60".

The third graph G3 indicates shifts in the liquid landing positions when the roller eccentricity is "0.01 mm". As can be appreciated from the third graph G3, shifts due to roller eccentricity are often in sync with the rotation cycle of the roller. Also, the amount of shift due to roller eccentricity is often proportional to the amount of eccentricity but is often not accumulated.

The fourth graph G4 indicates shifts in the liquid landing positions when roller eccentricity and thermal expansion of the rollers occur. Note that the fourth graph G4 illustrates an example case where thermal expansion of the rollers occurs as a result of a temperature change of "−10° C.".

The fifth graph G5 indicates shifts in the liquid landing positions when roller eccentricity and slippage between the web 120 and the rollers occur. Note that the fifth graph G5 illustrates an example case where the slippage occurring between the web 120 and the roller is "0.1%".

Further, note that in order to reduce meandering of the web, in some embodiments, tension may be applied to pull the web in the conveying direction. In some cases, such tension may cause elongation and/or contraction of the web 120. Also, the expansion and/or contraction of the web 120 may vary depending on the thickness of the web 120, the width of the web 120, and/or the amount of coating applied to the web 120, for example.

As described above, a liquid ejection apparatus according to an embodiment of the present invention is configured to obtain, with respect to each of a plurality of liquid ejection head units, a detection result of a position, a moving speed, and/or an amount of movement in the conveying direction of a conveyed object. In this way, the liquid ejection apparatus according to an embodiment of the present invention may be able to determine the liquid ejection timing of each liquid ejection head unit based on a shift, for example. Thus, as compared with the comparative example illustrated in FIG. 16, for example, the liquid ejection apparatus according to an embodiment of the present invention may be able to more accurately correct shifts in the landing positions of ejected liquid that occur with respect to the conveying direction.

Also, in the liquid ejection apparatus according to an embodiment of the present invention, the distance between the liquid ejection head units does not have to be an integer multiple of the circumference of a roller as in the comparative example illustrated in FIG. 16, and as such, restrictions for installing the liquid ejection head units may be reduced in the liquid ejecting apparatus according to an embodiment of the present invention.

Further, unlike the comparative example illustrated in FIG. 16 where the amount of movement is calculated based on the amount of rotation of the roller, in the liquid ejection apparatus according to an embodiment of the present invention, a position of the web 120 may be directly detected. As such, influences of thermal expansion of the roller and the like may be accurately cancelled in the liquid ejection apparatus according to an embodiment of the present invention, for example. Further, by performing detection in the vicinity of each liquid ejection head unit, other influences, such as expansion and/or contraction of the web 120 may also be accurately cancelled in the liquid ejection apparatus according to an embodiment of the present invention.

By reducing the influences of roller eccentricity, thermal expansion of the roller, slippage between the web 120 and the roller, the contraction/expansion of the web 120, or combinations thereof as described above, the liquid ejection apparatus according to an embodiment of the present invention may be able to more accurately control the landing position of ejected liquid in the conveying direction.

Also, in the case of forming an image on a recording medium by ejecting liquid, by improving the accuracy of the landing positions of ejected liquids in the different colors, the liquid ejection apparatus according to an embodiment of the present invention may be able to reduce the occurrence of color shifts and thereby improve the image quality of the formed image.

Further, in the liquid ejection apparatus according to an embodiment of the present invention, each detection unit provided with respect to each liquid ejection head unit may be configured to detect, at least two different timings, the position of a conveyed object, the moving speed of the conveyed object, and/or the amount of movement of the conveyed object for its corresponding liquid ejection head unit based on a pattern included in the conveyed object. In this way, the liquid ejection timing of each of the liquid ejection head units may be individually controlled based on detection results obtained for each liquid ejection head unit. Thus, the liquid ejection apparatus may be able to more accurately correct shifts in the liquid landing positions occurring in the conveying direction.

<Modifications>

In adjusting the timings at which a plurality of liquid ejection head units eject liquid, a liquid ejection apparatus according to an embodiment of the present invention may adjust the liquid ejection timing of each of liquid ejection head unit based on a detection result obtained by a sensor provided for the corresponding liquid ejection head unit and a detection result obtained by a sensor provided for the most upstream liquid ejection head unit, for example.

Specifically, assuming that the liquid ejection head units for the different colors are installed in the order of black, cyan, magenta, and yellow from the upstream side toward the downstream side as illustrated in FIG. 2, for example, the black sensor SENK provided for the black liquid ejection head unit 210K would correspond to the sensor provided for the most upstream liquid ejection head unit.

In the above example, the liquid ejection apparatus adjusts the liquid ejection timing of the cyan liquid ejection head unit 210C based on a detection result obtained by the black sensor SENK and a detection result obtained by the cyan sensor SENC. Further, the liquid ejection apparatus adjusts the liquid ejection timing of the magenta liquid ejection head unit 210M based on a detection result obtained by the black sensor SENK and a detection result obtained by the magenta sensor SENM. Similarly, the liquid ejection apparatus adjusts the liquid ejection timing of the yellow liquid ejection head unit 210Y based on a detection result obtained by the black sensor SENK and a detection result obtained by the yellow sensor SENY.

By using the detection result obtained by the sensor provided for the most upstream liquid ejection head unit as described above, errors may be less likely to be integrated.

Thus, the liquid ejection apparatus may be able to more accurately correct shifts occurring in the landing position of ejected liquid, for example.

However, as long as errors are within an acceptable tolerance range, the combination of detection results used need not include the detection result obtained by the sensor provided for the most upstream liquid ejection head unit as described above. For example, in some embodiments, the liquid ejection apparatus may adjust the liquid ejection timing of the magenta liquid ejection head unit 210M based on a detection result obtained by the cyan sensor SENC and a detection result obtained by the magenta sensor SENM.

Note that the detection device 50 illustrated in FIG. 4 may also be implemented by the following hardware configurations, for example.

Figure 19:
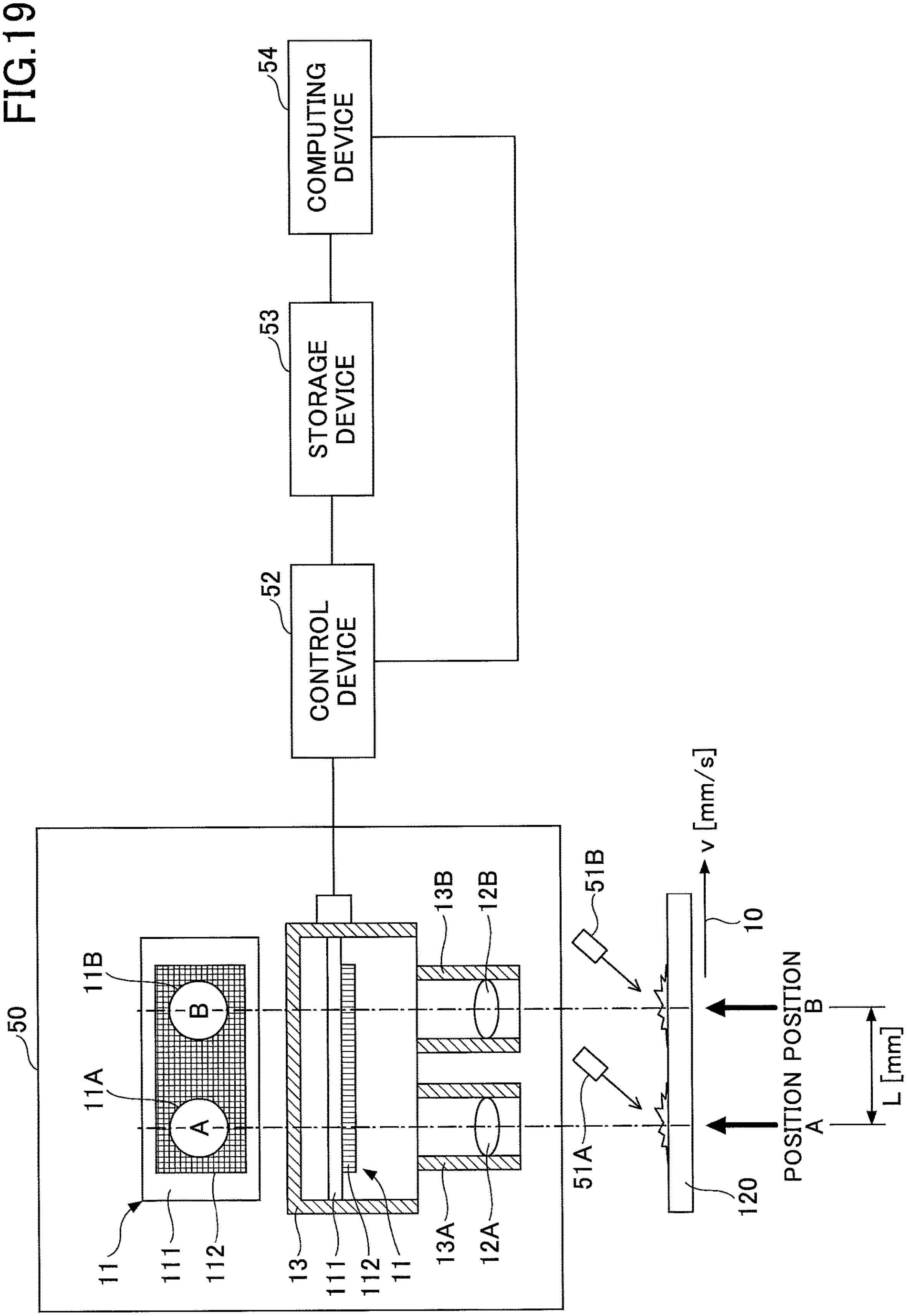
FIG. 19 is a schematic diagram illustrating a first example modification of the hardware configuration for implementing the detection unit according to an embodiment of the present invention.

FIG. 19 is a schematic diagram illustrating a first example modification of the hardware configuration for implementing the detection unit according to an embodiment of the present invention. In the following description, devices that substantially correspond to the devices illustrated in FIG. 4 are given the same reference numerals and descriptions thereof may be omitted.

The hardware configuration of the detection unit 50 according to the first example modification differs from the hardware configuration as described above in that the detection device 50 includes a plurality of optical systems. That is, the hardware configuration described above has a so-called "simple-eye" configuration whereas the hardware configuration of the first example modification has a so-called "compound-eye" configuration.

Note that in the following description of the detection device 50 according to the first example modification using the so-called "compound-eye" optical system, a position at which detection is performed using a first imaging lens 12A arranged at an upstream side is referred to as "position A", and a position at which detection is performed using a second imaging lens 12B that is arranged downstream of the first imaging lens 12A is referred to as "position B". Also, in the following description, the distance "L" refers to the distance between the first imaging lens 12A and the second imaging lens 12B.

In FIG. 19, laser light is irradiated from a first light source 51A and a second light source 51B onto the web 120, which is an example of a detection target. Note that the first light source 51A irradiates light onto "position A", and the second light source 51B irradiates light onto "position B".

The first light source 51A and the second light source 51B may each include a light emitting element that emits laser light and a collimating lens that converts laser light emitted from the light emitting element into substantially parallel light, for example. Also, the first light source 51A and the second light source 51B are positioned such that laser light may be irradiated in a diagonal direction with respect to the surface of the web 120.

The detection device 50 includes an area sensor 11, the first imaging lens 12A arranged at a position facing "position A", and the second imaging lens 12B arranged at a position facing "position B".

The area sensor 11 may include an imaging element 112 arranged on a silicon substrate 111, for example. In the present example, it is assumed that the imaging element 112 includes "region A" 11A and "region B" 11B that are each capable of acquiring a two-dimensional image. The area sensor 11 may be a CCD sensor, a CMOS sensor, or a photodiode array, for example. The area sensor 11 is accommodated in a housing 13. Also, the first imaging lens 12A and the second imaging lens 12B are respectively held by a first lens barrel 13A and a second lens barrel 13B.

In the present example, the optical axis of the first imaging lens 12A coincides with the center of "region A" 11A. Similarly, the optical axis of the second imaging lens 12B coincides with the center of "region B" 11B. The first imaging lens 12A and the second imaging lens 12B respectively collect light that form images on "region A" 11A and "region B" 11B to generate two-dimensional images.

Note that the detection device 50 may also have the following hardware configurations, for example.

Figure 20:
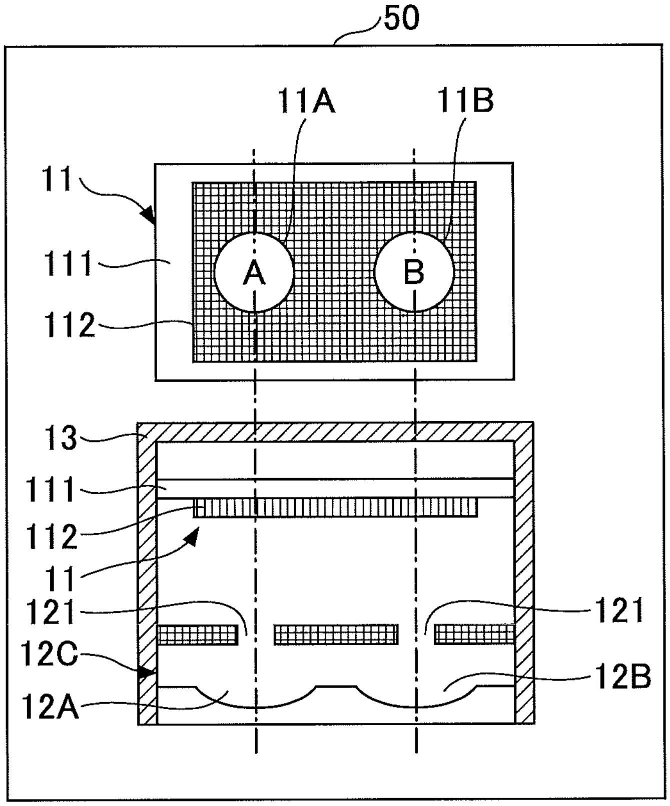
FIG. 20 is a schematic diagram illustrating a second example modification of the hardware configuration for implementing the detection unit according to an embodiment of the present invention.

FIG. 20 is a schematic diagram illustrating a second example modification of the hardware configuration for implementing the detection unit according to an embodiment of the present invention. In the following, features of the hardware configuration according to the second example modification that differ from those of FIG. 19 are described. That is, the hardware configuration of the detection device 50 according to the second example modification is described. The hardware configuration of the detection device 50 illustrated in FIG. 20 differs from that illustrated in FIG. 19 in that the first imaging lens 12A and the second imaging lens 12B are integrated into a lens 12C. Note that the area sensor 11 of FIG. 20 may have the same configuration as that illustrated in FIG. 19, for example.

In the present example, apertures 121 are preferably used so that the images of the first imaging lens 12A and the second imaging lens 12B do not interfere with each other in forming images on corresponding regions of the area sensor 11. By using such apertures 121, the corresponding regions in which images of the first imaging lens 12A and the second imaging lens 12B are formed may be controlled. Thus, interference between the respective images can be reduced, and the detection device 50 may be able to calculate the moving speed of a conveyed object at the installation position of an upstream side sensor based on images generated at "position A" and "position B", for example. Then, the detection device 50 may similarly calculate the moving speed of the conveyed object at the installation position of a downstream side sensor. In this way, the image forming apparatus 110 may control the liquid ejection timing of a liquid ejection head unit based on a speed difference between the moving speed calculated at the upstream side and the moving speed calculated at the downstream side, for example.

Figure 21B:
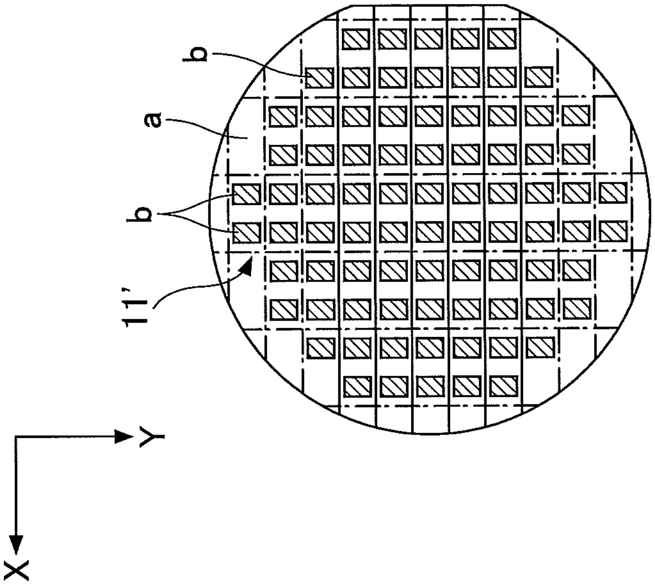
FIGS. 21A and 21B are schematic diagrams illustrating a third example modification of the hardware configuration for implementing the detection unit according to an embodiment of the present invention.
Figure 21A:
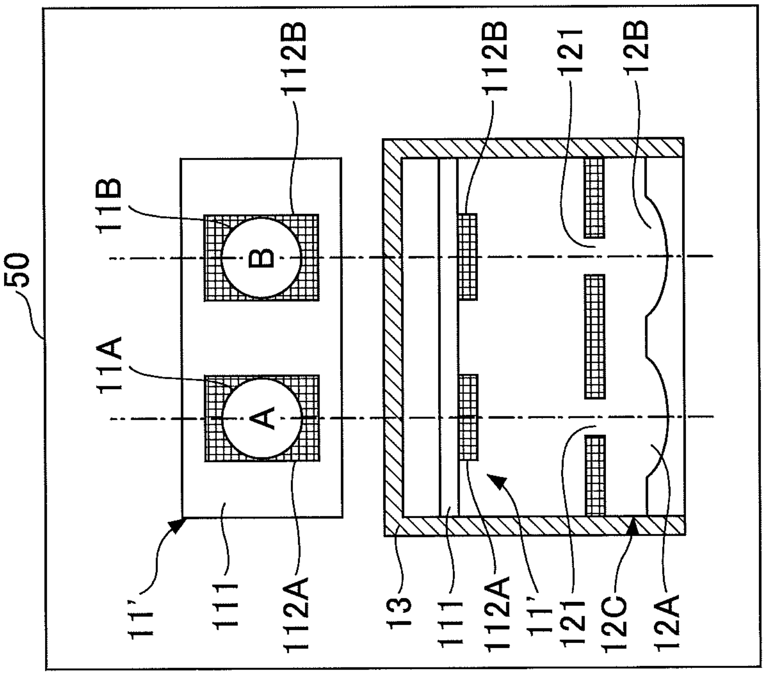

FIGS. 21A and 21B are schematic diagrams illustrating a third example modification of the hardware configuration for implementing the detection unit according to an embodiment of the present invention. The hardware configuration of the detection device 50 as illustrated in FIG. 21A differs from the configuration illustrated in FIG. 20 in that the area sensor 11 is replaced by a second area sensor 11'. Note that the configurations of the first imaging lens 12A and the second imaging lens 12B of FIG. 17B may be substantially identical to those illustrated in FIG. 20, for example.

The second area sensor 11' may be configured by imaging elements 'b' as illustrated in FIG. 21B, for example. Specifically, in FIG. 21B, a plurality of imaging elements 'b' are formed on a wafer 'a'. The imaging elements 'b' illustrated in FIG. 21B are cut out from the wafer 'a'. The cut-out imaging elements are then arranged on the silicon substrate 111 to form a first imaging element 112A and a second imaging element 112B. The positions of the first imaging lens 12A and the second imaging lens 12B are determined based on the distance between the first imaging element 112A and the second imaging element 112B.

Imaging elements are often manufactured for capturing images in predetermined formats. For example, the dimensional ratio in the X direction and the Y direction, i.e., the vertical-to-horizontal ratio, of imaging elements is often arranged to correspond to predetermined image formats, such as “1:1” (square), “4:3”, “16:9”, or the like. In the present embodiment, images at two or more points that are separated by a fixed distance are captured. Specifically, an image is captured at each of a plurality of points that are set apart by a fixed distance in the X direction (i.e., the conveying direction 10 of FIG. 2), which corresponds to one of the two dimensions of the image to be formed. On the other hand, as described above, imaging elements have vertical-to-horizontal ratios corresponding to predetermined image formats. Thus, in the case of imaging two points set apart from each other by a fixed distance in the X direction, imaging elements for the Y direction may not be used. Further, in the case of increasing pixel density, for example, imaging elements with high pixel density have to be used in both the X direction and the Y direction so that costs may be increased, for example.

In view of the above, in FIG. 21A, the first imaging element 112A and the second imaging element 112B that are set apart from each other by a fixed distance are formed on the silicon substrate 111. In this way, the number of unused imaging elements for the Y direction can be reduced to thereby avoid waste of resources, for example. Also, the first imaging element 112A and the second imaging element 112B may be formed by a highly accurate semiconductor process such that distance between the first imaging element 112A and the second imaging element 112B can be adjusted with high accuracy.

Figure 22:
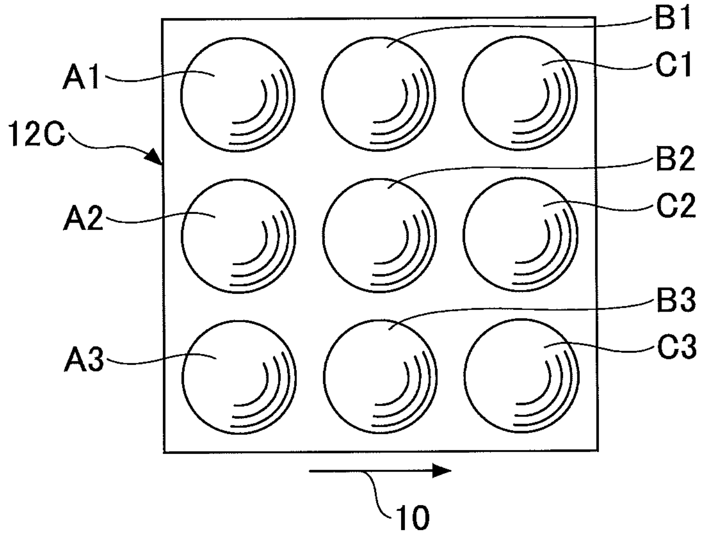
FIG. 22 is a schematic diagram illustrating an example of a plurality of imaging lenses used in the detection unit according to an embodiment of the present invention.

FIG. 22 is a schematic diagram illustrating an example of a plurality of imaging lenses used in the detection unit according to an embodiment of the present invention. That is, a lens array as illustrated in FIG. 22 may be used to implement the detection unit according to an embodiment of the present invention.

The illustrated lens array has a configuration in which two or more lenses are integrated. Specifically, the illustrated lens array includes a total of nine imaging lenses A1-A3, B1-B3, and C1-C3 arranged into three rows and three columns in the vertical and horizontal directions. By using such a lens array, images representing nine points can be captured. In this case, an area sensor with nine imaging regions would be used, for example.

By using a plurality of imaging lenses in the detection device as described above, for example, parallel execution of arithmetic operations with respect to two or more imaging regions at the same time may be facilitated, for example. Then, by averaging the multiple calculation results or performing error removal thereon, the detection device may be able to improve accuracy of its calculations and improve calculation stability as compared with the case of using only one calculation result, for example. Also, calculations may be executed using variable speed application software, for example. In such case, a region with respect to which correlation calculation can be performed can be expanded such that highly reliable speed calculation results may be obtained, for example.

Also, in some embodiments, one member may be used as both the first support member and the second support member. For example, the first support member and the second support member may be configured as follows.

Figure 23:
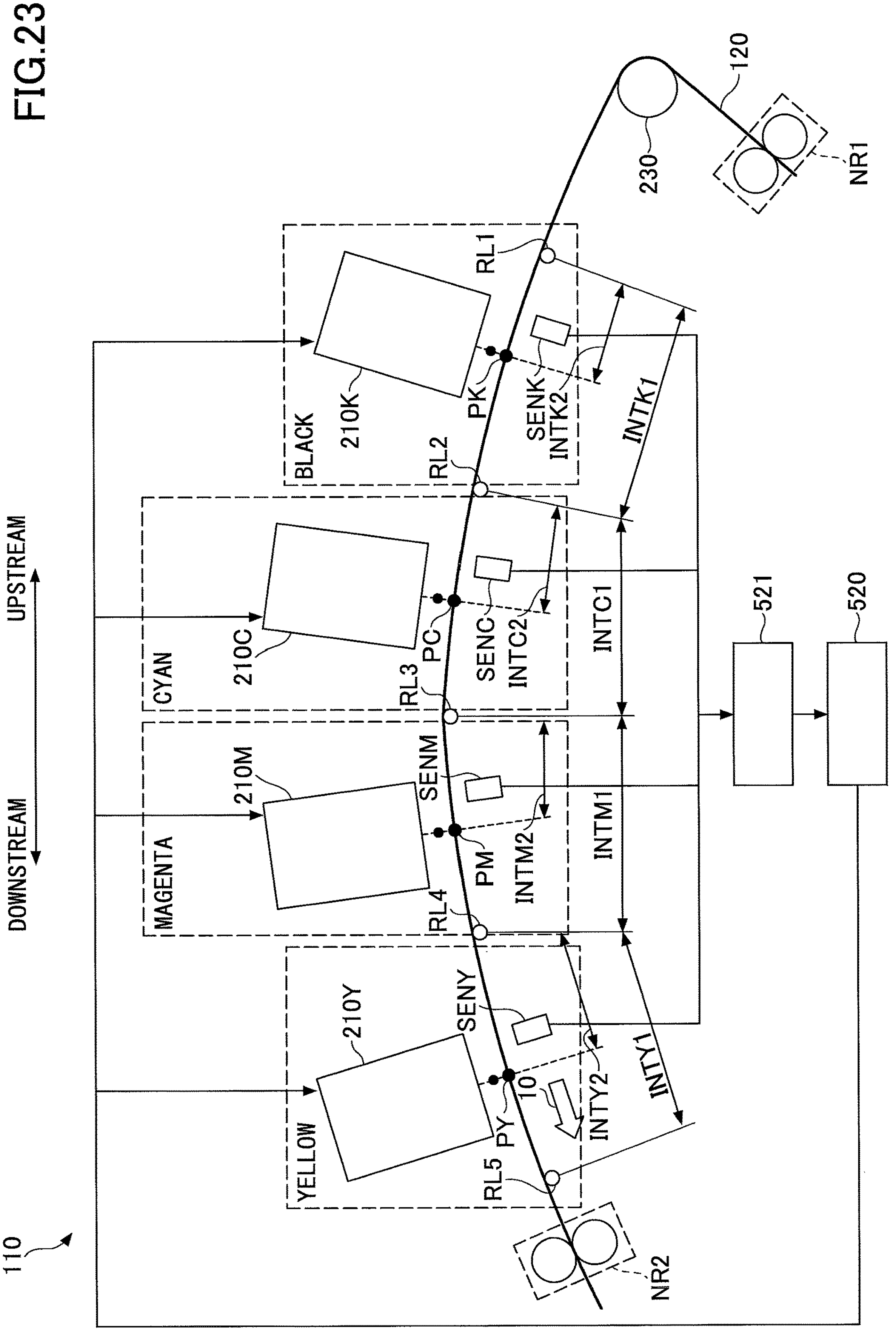
FIG. 23 is a schematic diagram illustrating an example modification of the liquid ejection apparatus according to an embodiment of the present invention.

FIG. 23 is a schematic diagram illustrating an example modified configuration of the liquid ejection apparatus according to an embodiment of the present invention. In the liquid ejection apparatus illustrated in FIG. 23, the configuration of the first support member and the second support member differs from that illustrated in FIG. 2. Specifically, in FIG. 23, a first member RL1, a second member RL2, a third member RL3, a fourth member RL4, and a fifth member RL5 are arranged as the first support member and the second support member. That is, in FIG. 23, the second member RL2 acts as the second support member for the black liquid ejection head unit 210K and the first support member for the cyan liquid ejection head unit 210C. Similarly, the third member RL3 acts as the second support member for the cyan liquid ejection head unit 210C and the first support member for the magenta liquid ejection head unit 210M. Further, the fourth member RL4 acts as the second support member for the magenta liquid ejection head unit 210M and the first support member for the yellow liquid ejection head unit 210Y. As illustrated in FIG. 23, in some embodiments, one support member may be configured to act as the second support member of an upstream side liquid ejection head unit and the first support member of a downstream side liquid ejection head unit, for example. Also, in some embodiments, a roller or a curved plate may be used as the support member acting as both the first support member and the second support member, for example.

Note that the liquid ejection apparatus according to an embodiment of the present invention may be implemented by a liquid ejection system including at least one liquid ejection apparatus. For example, in some embodiments, the black liquid ejection head unit 210K and the cyan liquid ejection head unit 210C may be included in one housing of one liquid ejection apparatus, and the magenta liquid ejection head unit 210M and the yellow liquid ejection head unit 210Y may be included in another housing of another liquid ejection apparatus, and the liquid ejection apparatus according to an embodiment of the present invention may be implemented by a liquid ejection system including both of the above liquid ejection apparatuses.

Also, note that the liquid ejected by the liquid ejection apparatus and the liquid ejection system according to embodiments of the present invention is not limited to ink but may be other types of recording liquid or fixing agent, for example. That is, the liquid ejection apparatus and the liquid ejection system according to embodiments of the present invention may also be implemented in applications that are configured to eject liquid other than ink.

Also, the liquid ejection apparatus and the liquid ejection system according to embodiments of the present invention are not limited to applications for forming a two-dimensional image. For example, embodiments of the present invention may also be implemented in applications for forming a three-dimensional object.

Further, the conveyed object is not limited to recording medium such as paper. That is, the conveyed object may be any material onto which liquid can be ejected including paper, thread, fiber, cloth, leather, metal, plastic, glass, wood, ceramic materials, and combinations thereof, for example.

Also, embodiments of the present invention may be implemented by a computer program that causes a computer of an image forming apparatus and/or an information processing apparatus to execute a part or all of a liquid ejection method according to an embodiment of the present invention, for example.

Although the present invention has been described above with reference to certain illustrative embodiments, the present invention is not limited to these embodiments, and numerous variations and modifications may be made without departing from the scope of the present invention.

What is claimed is:

1. A liquid ejection apparatus comprising:

a liquid ejection head unit configured to eject liquid onto a conveyed object being conveyed;

a detection unit that is provided for the liquid ejection head unit and is configured to output a detection result indicating at least one of a position, a moving speed, and an amount of movement of the conveyed object with respect to a conveying direction of the conveyed object; and a control unit configured to control the liquid ejection head unit to eject liquid at a timing based on the detection result received from the detection unit, wherein the detection unit includes a plurality of optical sensors in which a first optical sensor from among the plurality of optical sensors is provided upstream, with respect to a conveying direction of the conveyed object, of a second optical sensor from among the plurality of optical sensors, and a source of coherent light provided to a respective optical sensor from among the plurality of optical sensors, the source of coherent light being positioned such that the coherent light is emitted in a diagonal direction with respect to the surface of the conveyed object;

the coherent light emitted from the source of coherent light is detected by the respective optical sensor;

the detection unit generates a two-dimensional image using the light emitted from source of coherent light, and outputs the detection result based on the two-dimensional image; and the detection unit performs detection at a detection timing determined based on a minimum time required for conveying the conveyed object between two adjacent liquid ejection head units.

2. The liquid ejection apparatus according to claim 1, wherein the control unit determines the timing based on the detection results of an upstream detection unit and a downstream detection unit arranged downstream of the upstream detection unit with respect to the conveying direction of the conveyed object; and the timing determined by the control unit includes at least a liquid ejection timing of a corresponding liquid ejection head unit of liquid ejection head units that is associated with the downstream detection unit.

3. The liquid ejection apparatus according to claim 1, wherein the control unit determines, with respect to the each liquid ejection head unit, the timing at which the each liquid ejection head unit ejects liquid based on the plurality of detection results.

4. The liquid ejection apparatus according to claim 1, wherein the control unit determines the timing by calculating a required time for conveying the conveyed object to a landing position at which a corresponding liquid ejection head unit can eject liquid based on the plurality of detection results.

5. The liquid ejection apparatus according to claim 1, further comprising:

a first support member that is arranged at a conveying direction upstream side of a landing position at which the liquid ejection head unit can eject liquid onto a predetermined portion of the conveyed object; and a second support member that is arranged at a conveying direction downstream side of the landing position;

wherein the detection unit is installed between the first support member and the second support member that are provided for the liquid ejection head unit.

6. The liquid ejection apparatus according to claim 5, wherein the detection unit is arranged at a position toward the first support member with respect to the landing position.

7. The liquid ejection apparatus according to claim 1, wherein an image is formed on the conveyed object when the liquid is ejected from the liquid ejection head unit.

8. The liquid ejection apparatus according to claim 1, wherein the conveyed object is a continuous sheet extending in the conveying direction.

9. The liquid ejection apparatus according to claim 1, further comprising:

a measuring unit configured to measure the amount of movement of the conveyed object;

wherein the control unit controls the liquid ejection head unit to eject the liquid based on the amount of movement measured by the measuring unit and the detection result.

10. The liquid ejection apparatus according to claim 1, wherein the control unit controls the liquid ejection head unit to eject the liquid based on an installation distance between a detection position at which the detection unit performs detection and a landing position at which the liquid ejection head unit can eject liquid, a shift in the landing position with respect to the detection position, and the moving speed of the conveyed object.

11. The liquid ejection apparatus according to claim 1, wherein the detection unit obtains the detection result based on a pattern included in the conveyed object.

12. The liquid ejection apparatus according to claim 11, wherein the the pattern is generated by interference of light irradiated on a roughness formed on the conveyed object; and the detection unit obtains the detection result based on an image capturing the pattern.

13. A liquid ejection system comprising:

at least one liquid ejection apparatus including a liquid ejection head unit configured to eject liquid onto a conveyed object being conveyed;

a detection unit that is provided for the liquid ejection head unit and is configured to output a detection result indicating at least one of a position, a moving speed, and an amount of movement of the conveyed object with respect to a conveying direction of the conveyed object; and a control unit configured to control the liquid ejection head unit to eject liquid at a timing based on the detection result received from the detection unit, wherein the detection unit includes a plurality of optical sensors in which a first optical sensor from among the plurality of optical sensors is provided upstream, with respect to a conveying direction of the conveyed object, of a second optical sensor from among the plurality of optical sensors, and a source of coherent light provided to a respective optical sensor from among the plurality of optical sensors, the source of coherent light being positioned such that the coherent light is emitted in a diagonal direction with respect to the surface of the conveyed object;

the coherent light emitted from the source of coherent light is detected by the respective optical sensor;

the detection unit generates a two-dimensional image using the light emitted from source of coherent light, and outputs the detection result based on the two-dimensional the detection unit performs detection at a detection timing determined based on a minimum time required for conveying the conveyed object between two adjacent liquid ejection head units.

14. A liquid ejection method that is implemented by a liquid ejection apparatus including a liquid ejection head unit configured to eject liquid onto a conveyed object being conveyed and a detection unit provided for the liquid ejection head unit, the liquid ejection method comprising steps of:

detecting, by the detection unit, at least one of a position, a moving speed, and an amount of movement of the conveyed object with respect to a conveying direction of the conveyed object;

outputting, with respect to the liquid ejection head unit, a detection result indicating the at least one of the detected position, the detected moving speed, and the detected amount of movement of the conveyed object with respect to a conveying direction of the conveyed object; and controlling the liquid ejection head unit to eject liquid at a timing based on the detection result, wherein the detection unit includes a plurality of optical sensors in which a first optical sensor from among the plurality of optical sensors is provided upstream, with respect to a conveying direction of the conveyed object, of a second optical sensor from among the plurality of optical sensors, and a source of coherent light provided to a respective optical sensor from among the plurality of optical sensors, the source of coherent light being positioned such that the coherent light is emitted in a diagonal direction with respect to the surface of the conveyed object;

the coherent light emitted from the source of coherent light is detected by the respective optical sensor;

the detection unit generates a two-dimensional image using the light emitted from source of coherent light, and outputs the detection result based on the two-dimensional image; and the detection unit performs detection at a detection timing determined based on a minimum time required for conveying the conveyed object between two adjacent liquid ejection head units.

* * * * *